United States Patent
Koorapati et al.

(10) Patent No.: US 12,411,748 B2
(45) Date of Patent: Sep. 9, 2025

(54) CONVERTING TELEMETRY VALUES INTO COMMON DATA FORMATS IN A PROCESSOR-BASED SYSTEM IN AN INTEGRATED CIRCUIT (IC) CHIP

(71) Applicant: QUALCOMM Incorporated, San Diego, CA (US)

(72) Inventors: Sagar Koorapati, Austin, TX (US); Pradeep Kanapathipillai, Campbell, CA (US); Alon Naveh, Corte Madera, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 18/339,520

(22) Filed: Jun. 22, 2023

(65) Prior Publication Data

US 2024/0427682 A1  Dec. 26, 2024

(51) Int. Cl.
*G06F 1/00* (2006.01)
*G06F 1/3206* (2019.01)
*G06F 11/30* (2006.01)

(52) U.S. Cl.
CPC ........ *G06F 11/3062* (2013.01); *G06F 1/3206* (2013.01)

(58) Field of Classification Search
CPC ................... G06F 11/3062; G06F 1/3206
See application file for complete search history.

(56) References Cited

U.S. PATENT DOCUMENTS

| | | | |
|---|---|---|---|
| 11,438,211 B1* | 9/2022 | Lyubomirsky | H04L 41/0654 |
| 2009/0271643 A1* | 10/2009 | Vaidyanathan | G06F 11/3466 |
| | | | 713/340 |
| 2013/0145180 A1 | 6/2013 | Branover et al. | |
| 2013/0285834 A1* | 10/2013 | Sellers | G01D 4/002 |
| | | | 340/870.02 |
| 2016/0291680 A1 | 10/2016 | Ma et al. | |
| 2020/0183482 A1 | 6/2020 | Sebot et al. | |

(Continued)

FOREIGN PATENT DOCUMENTS

| | | |
|---|---|---|
| CN | 113608060 A | 11/2021 |
| CN | 114697121 A | 7/2022 |

OTHER PUBLICATIONS

Idkhajine L., et al., "System on Chip Controller for Electrical Actuator," 2008 IEEE International Symposium on Industrial Electronics, Jun. 30-Jul. 2, 2008, Cambridge, UK, IEEE, pp. 2481-2486.

(Continued)

*Primary Examiner* — Xuxing Chen
(74) *Attorney, Agent, or Firm* — W&T

(57) ABSTRACT

Converting telemetry values into common data formats in a processor-based system in an integrated circuit (IC) chip is disclosed herein. In one aspect, an IC chip comprises a processor-based system that that is configured to receive an input telemetry value from an input source circuit. The processor-based system converts the input telemetry value into a common format telemetry value, wherein a first unit value represented by a least significant bit of the common format telemetry value is greater than one (1) and is based on a quotient of a power of two (2) and a corresponding power of 10. The processor-based system then processes common format telemetry value.

25 Claims, 16 Drawing Sheets

(56) References Cited

U.S. PATENT DOCUMENTS

| | | |
|---|---|---|
| 2021/0072955 A1 | 3/2021 | Mellempudi et al. |
| 2022/0011843 A1* | 1/2022 | MacNamara ....... G06F 11/3062 |
| 2022/0091650 A1 | 3/2022 | Thompson et al. |
| 2022/0269931 A1 | 8/2022 | Mellempudi et al. |
| 2022/0413591 A1* | 12/2022 | Shah ....................... G06F 1/324 |
| 2024/0104270 A1* | 3/2024 | Das ........................ G06F 30/27 |

OTHER PUBLICATIONS

International Search Report and Written Opinion for International Patent Application No. PCT/US2024/028501, mailed Sep. 3, 2024, 13 pages.

\* cited by examiner

CONVERTING TELEMETRY VALUES INTO COMMON DATA FORMATS IN A PROCESSOR-BASED SYSTEM IN AN INTEGRATED CIRCUIT (IC) CHIP

BACKGROUND

I. Field of the Disclosure

The field of the disclosure relates to processor-based systems (e.g., a central processing unit (CPU)-based system, a graphic processing unit (GPU)-based system, or a neural network processing unit (NPU)-based system), and more particularly to a common data format in a processor-based system.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU, or as a discrete hardware element that is separate from the CPU. Other examples of PUs may include neural network processing units or neural processing units (NPUs). In cases of PUs, the PUs are configured to execute software instructions that instruct a processor to fetch data from a location in memory, and to perform one or more processor operations using the fetched data.

PUs are included in a computer system that includes other supporting processing devices (circuits) involved with or accessed as part of performing computing operations in the computer system. Examples of these other supporting processing devices include memory, input/output (I/O) devices, secondary storage, modems, video processors, and related interface circuits. The PUs and supporting processing devices are referred to collectively as processing devices. Processing devices of a processor-based system can be provided in separate ICs in separate IC chips. Alternatively, processing devices of a processor-based system can also be aggregated in a larger IC, like a system-on-a-chip (SoC) IC, wherein some or all of these processing devices are integrated into the same IC chip. For example, a SoC IC chip may include a PU that includes a plurality of processor cores and supporting processing devices such as a memory system that includes cache memory and memory controllers for controlling access to external memory, I/O interfaces, power management systems, etc. A SoC may be particularly advantageous for applications in which a limited area is available for the computer system (e.g., a mobile computing device such as cellular device). To manage power distributed to the processing devices, the SoC may also include a power management system that includes one or more power rails in the SoC that supply power to its components. A separate power management integrated circuit (PMIC) that can be on- or off-chip with the SoC can independently control power supplied to the power rails. The SoC may be designed with a plurality of different power rails that are distributed within the SoC to provide power to various clusters of the processing devices for their operation. For example, all the processor cores in the SoC may be coupled to a common power rail for power, whereas supporting processing devices may be powered from separate power rails in the SoC, depending on the design of the SoC.

SUMMARY OF THE DISCLOSURE

Aspects disclosed herein include converting telemetry values into common data format in a processor-based system. Further aspects include hierarchical power estimation and throttling in a processor-based system in an integrated circuit (IC) chip that makes use of the common data format. Related power management and power throttling methods are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), graphics processing unit (GPU) or a neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller, mobile devices (e.g., a cellular phone, a laptop computer), as well as enterprise systems such as server chips in computer servers. The IC chip also includes a hierarchical power management system that is configured to control power consumption by the processor-based system at both local and centralized levels to achieve a desired performance within an overall power budget for the IC chip. The hierarchical power management system can be configured to control power consumption by controlling the power level (e.g., voltage level) distributed at one or more power rails in the IC chip that provide power to the PUs and the integrated supporting processing devices. For example, the hierarchical power management system can be configured to provide additional power to certain power rails supplying power to higher current demanding devices to achieve higher performance, while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note as used herein, throttle can mean to take an action that will decrease or increase a parameter that affects power and thus results in a respective decrease or increase in power consumption.

The hierarchical power management system is configured to throttle performance of the processing devices in the processor-based system, because the level of processing activity in the processing devices in a SoC can vary based on workload conditions. Some power rails in the SoC may experience heightened current demand. It is desired that this current demand not exceed the maximum current limitations of its respective power rail. Even if a higher current demand on a power rail is within its maximum current limits, a heightened activity of a processing device in the SoC can generate a sudden increase in current demand from its power rail, referred to as a "di/dt" event. This di/dt event can cause a voltage droop in the power rail, thus negatively affecting performance of processing devices powered by such power rail. Also, even if a higher current demand on a power rail is within its maximum current limits, a higher current demand can increase the overall power consumption of the SoC. Processing devices may have a maximum power rating to properly operate and/or to not impact performance in an undesired manner. Higher current demand from processing devices can also generate excess heat. Thus, the maximum power rating of the SoC may be based in part on the ability of the SoC to dissipate heat generated by the processing devices during their operation.

In exemplary aspects, the hierarchical power management system includes local area management (LAM) circuits distributed in the IC chip that are each associated with one or more processing devices in the IC chip. The LAM circuits are configured to generate power events associated with its monitored processing devices in the IC chip that represent power consumption associated with the monitored processing devices in the IC chip. The power events can be reported from local areas in the IC chip where power estimations for particular monitored processing devices are performed, to a centralized power estimation and limit (PEL) circuit in the hierarchical power management system. The PEL circuit is configured to estimate and control (i.e., throttle) power in the processor-based system in the IC chip to achieve a desired performance within an overall power budget for the IC chip. The PEL circuit determines how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

The activity of the processing devices in the IC chip affects its steady state and transient current (i) demand (di/dt), and thus its power consumption. Because the IC chip may be larger in terms of die area due to the integration of the PUs and integrated supporting processing devices, there can be significant delay between when the PEL circuit receives a power event regarding power consumption of a monitored processing device and the PEL circuit throttling power in the IC chip to throttle power consumption in response. This delay can, for example, cause devices in the IC chip to temporarily continue to consume excess power that can cause thermal and/or power issues (e.g., di/dt issues, voltage droop, heat generation) before the power management circuit has time to react.

Mechanisms for addressing the above-noted issues may face additional challenges because the various processing devices reporting telemetry data (e.g., power telemetry data reported to the PEL circuit) may employ different units, precisions, and dynamic ranges when measuring energy and/or electric charge. Accordingly, telemetry data received from different processing devices must be scaled and/or converted into common ranges and units, before processing the data (e.g., by aggregating the data from the different processing devices for estimation for longer time windows). However, such scaling and conversion operations may require the use of multiplier circuits and/or divider circuits, which may increase the complexity of the SoC, consume additional processor resources, and negatively affect the overall performance of the SoC.

To convert telemetry values (e.g., data received as part of the received power events) into common data formats, the IC chip (e.g., using the PEL circuit in exemplary aspects disclosed herein) is configured to receive an input telemetry value from an input source circuit of the processor-based system of the IC chip. The input source circuit may comprise, as non-limiting examples, a LAM circuit of the IC, a regional activity management (RAM) circuit of the IC, a processing unit of the IC, or a power management IC (PMIC) of the IC. The IC chip converts the input telemetry value into the common format telemetry value. However, instead of performing multiplying or dividing the input telemetry value by a power of 10 to convert it into the common format telemetry value (which would require the use of a multiplier circuit and/or a divider circuit), the IC chip is configured to perform a bit shift operation on the input telemetry value, effectively multiplying or dividing the input telemetry value by a power of two (2). The common format telemetry value is then stored as a value wherein a unit value represented by a least significant bit of the common format telemetry value is greater than one (1) and is based on a quotient of the power of two (2) and a corresponding power of 10. In some aspects, the input telemetry value comprises an input power telemetry value and the common format telemetry value is a common format power telemetry value, with the input power telemetry value and the common format power telemetry value each representing a power measurement (e.g., a measurement of one of capacitance, electric charge, energy, and current, as non-limiting examples).

For instance, if the input telemetry value comprises a micro-unit to be converted into a milli-unit (i.e., by dividing the input telemetry value by $10^3$ or 1,000), the IC chip is configured to convert the input telemetry value into the common format telemetry value by performing a rightward bit shift of the input telemetry value by 10 bits (i.e., dividing the input telemetry value by $2^{10}$ or 1,024), with the unit value of the resulting common format telemetry value being 1.024 based on the quotient of $2^{10}/10^3$. In aspects in which conversion from, e.g., a nano-unit to a milli-unit is required (i.e., by dividing the input telemetry value by $10^6$ or 1,000,000), the IC chip is configured to convert the input telemetry value into the common format telemetry value by performing a rightward bit shift of the input telemetry value by 20 bits (i.e., dividing the input telemetry value by $2^{20}$ or 1,048,576), with the unit value of the resulting common format telemetry value being 1.048 based on the quotient of $2^{20}/10^6$. Aspects in which the input telemetry value comprises, for example, a pico-unit to be converted into a milli-unit (i.e., by dividing the telemetry value by $10^9$ or 1,000,000,000), the IC chip is configured to convert the input telemetry value into the common format telemetry value by performing a rightward bit shift of the input telemetry value by 30 bits (i.e., dividing the input telemetry value by $2^{30}$ or 1,073,741,824), with the unit value of the resulting common format telemetry value being 1.073 based on the quotient of $2^{30}/10^9$.

The IC chip may process the common format telemetry value. In some examples, the PEL circuit of the IC chip may aggregate the common format power telemetry value into an aggregated power telemetry value, by, e.g., summing the common format power telemetry value with a current value of the aggregated power telemetry value having the same unit value. The PEL circuit may subsequently generate a power limiting management response to cause power consumption to be throttled in the IC chip based on the aggregated power telemetry value. In aspects in which an input source circuit may provide an input power telemetry value having a unit value that already matches the unit value of the aggregated power telemetry value (and thus may not require conversion), the PEL circuit may be configured to first determine whether a conversion of the input power telemetry value into a common format power telemetry value is required. In such aspects, the PEL circuit converts the input power telemetry value into the common format power telemetry value responsive to determining that the conversion of the input power telemetry value into the common format power telemetry value is required.

While in exemplary examples of the present disclosure, the IC chip comprising a processor-based system is described as comprising a centralized PEL circuit, aspects of the present disclosure are not limited to IC chips and processor-based systems that comprise PEL circuits. Furthermore, while in exemplary examples of the present disclosure, the input telemetry value is an input power telemetry value, and the common format telemetry value is a common format power telemetry value, aspects of the present disclosure are not limited to telemetry values representing in power. Rather, the methods, apparatuses, computer programs and non-transitory computer-readable medium according to the present disclosure may be useful in any processor-based systems where values from different sources, having different units, and/or comprising unitless quantities may be stored and converted to a common format.

In some aspects, a firmware of the processor-based system may receive an aggregated power telemetry value (e.g., as a result of the PEL circuit reporting the aggregated power telemetry value to the firmware). The firmware may perform post-processing to convert the aggregated power telemetry value to a converted power telemetry value, wherein a unit value represented by a least significant bit of the converted power telemetry value is one (1). This may be accomplished in some aspects by multiplying the aggregated power telemetry value by the unit value of the aggregated power telemetry value. For example, if the unit value of a least significant bit of the aggregated power telemetry value is 1.024, the firmware may convert the aggregated power telemetry to the converted power telemetry value by multiplying the aggregated power telemetry value by 1.024. The converted power telemetry value may then be used by the firmware for other post-processing operations and/or estimations, configuration of configuration state registers (CSRs), and the like.

In another exemplary aspect, an IC chip is disclosed. The IC chip comprises a processor-based system. The processor-based system is configured to receive, from an input source circuit of the processor-based system, an input telemetry value. The processor-based system is further configured to convert the input telemetry value into a common format telemetry value, wherein a first unit value represented by a least significant bit of the common format telemetry value is greater than one (1) and is based on a quotient of a power of two (2) and a corresponding power of 10. The processor-based system is also configured to process the common format telemetry value.

In another exemplary aspect, an IC chip is disclosed. The IC chip comprises means for receiving, from an input source circuit, an input telemetry value. The IC chip may further comprise means for converting the input telemetry value into a common format telemetry value, wherein a first unit value represented by a least significant bit of the common format telemetry value is greater than one (1) and is based on a quotient of a power of two (2) and a corresponding power of 10. The IC chip also comprise means for processing the common format telemetry value.

In another exemplary aspect, a method for converting power telemetry values into common data formats in a processor-based system in an IC chip is disclosed. The method comprises receiving, from an input source circuit of the processor-based system, an input telemetry value. The method further comprises converting the input telemetry value into a common format telemetry value, wherein a first unit value represented by a least significant bit of the common format telemetry value is greater than one (1) and is based on a quotient of a power of two (2) and a corresponding power of 10. The method also comprises processing the common format telemetry value.

In another exemplary aspect, a non-transitory computer-readable medium is disclosed. The non-transitory computer-readable medium stores thereon computer-executable instructions that, when executed, cause a processor of a processor-based device to receive, from an input source circuit of the processor-based system, an input telemetry value. The computer-executable instructions further cause the processor to convert the input telemetry value into a common format telemetry value, wherein a first unit value represented by a least significant bit of the common format telemetry value is greater than one (1) and is based on a quotient of a power of two (2) and a corresponding power of 10. The computer-executable instructions also cause the processor to process the common format telemetry value.

DETAILED DESCRIPTION

Figure 1:
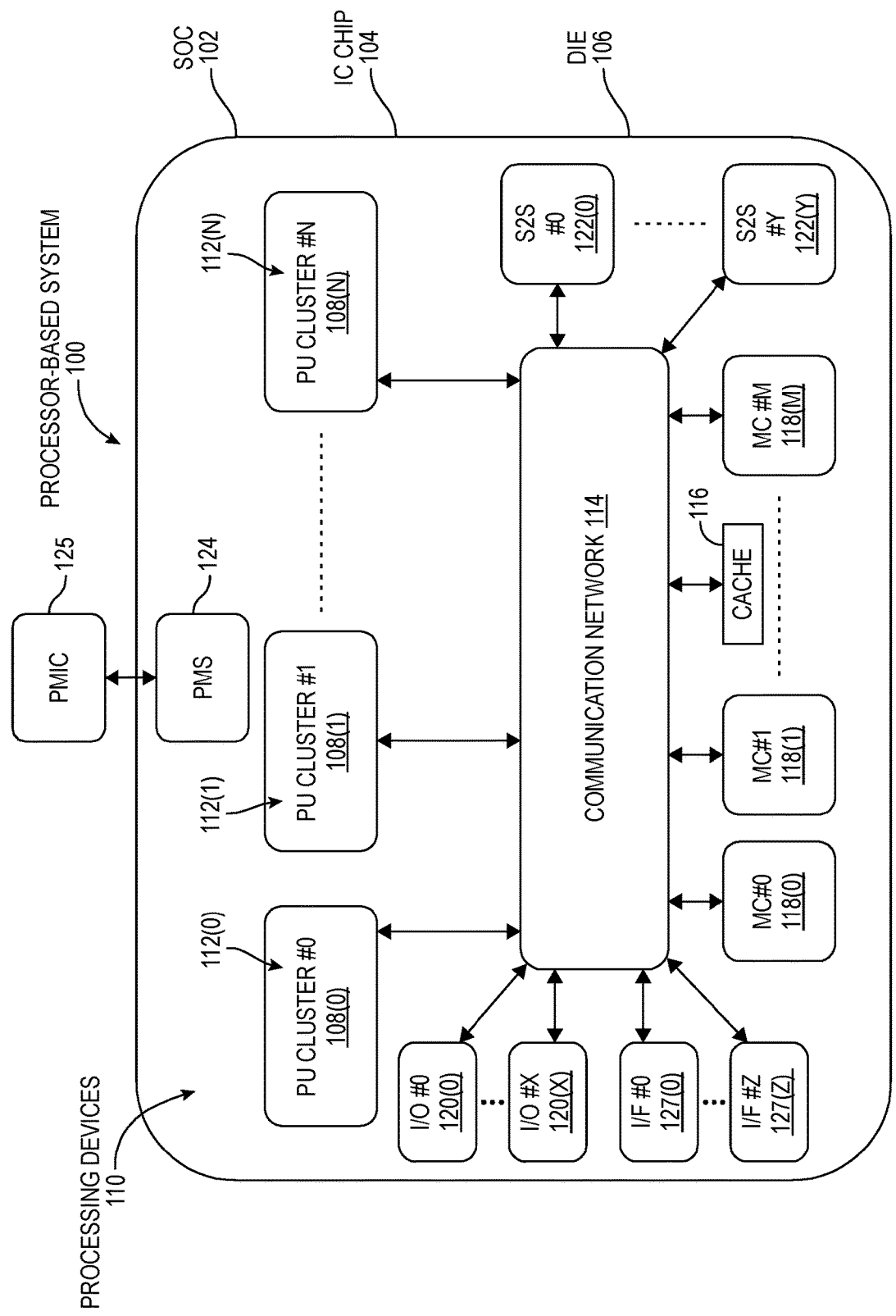
FIG. 1 is a schematic diagram of an exemplary processor-based system in the form of an exemplary system-on-a-chip (SoC) in an integrated circuit (IC) chip.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include a hierarchical power estimation and throttling in a processor-based system in an integrated circuit (IC) chip. Related power management and power throttling methods are also disclosed. The IC chip includes a processor as well as integrated supporting processing devices (e.g., network nodes, memory controllers, internal memory, input/output (I/O) interface circuits, etc.) for the processor. For example, the processor may be a central processing unit (CPU), graphics processing unit (GPU) or a neural network processing unit (NPU), wherein the processor includes multiple processing units (PUs) and/or processor cores. The processor-based system may be provided as a system-on-a-chip (SoC) that includes a processor and the integrated supporting processing devices for the PU. As examples, the SoC may be employed in smaller, mobile devices (e.g., a cellular phone, a laptop computer), as well as enterprise systems such as server chips in computer servers. The IC chip also includes a hierarchical power management system that is configured to control power consumption by the processor-based system at both local and centralized levels to achieve a desired performance within an overall power budget for the IC chip. The hierarchical power management system can be configured to control power consumption by controlling the power level (e.g., voltage level) distributed at one or more power rails in the IC chip that provide power to the PUs and the integrated supporting processing devices. For example, the hierarchical power management system can be configured to provide additional power to certain power rails supplying power to higher current demanding devices to achieve higher performance, while providing less power to other power rails to keep the overall power within power and/or thermal limits for the IC chip. The hierarchical power management system can also be configured to control power consumption by throttling performance (e.g., frequency) of the processing devices in the processor-based system, which in turn throttles (i.e., reduces, maintains, or increases) their current demand and thus their power consumption. Note as used herein, throttle can mean to take an action that will decrease or increase a parameter that affects power and thus results in a respective decrease or increase in power consumption.

The hierarchical power management system is configured to throttle performance of the processing devices in the processor-based system, because the level of processing activity in the processing devices in a SoC can vary based on workload conditions. Some power rails in the SoC may experience heightened current demand. It is desired that this current demand not exceed the maximum current limitations of its respective power rail. Even if a higher current demand on a power rail is within its maximum current limits, a heightened activity of a processing device in the SoC can generate a sudden increase in current demand from its power rail, referred to as a "di/dt" event. This di/dt event can cause a voltage droop in the power rail, thus negatively affecting performance of processing devices powered by such power rail. Also, even if a higher current demand on a power rail is within its maximum current limits, a higher current demand can increase the overall power consumption of the SoC. Processing devices may have a maximum power rating to properly operate and/or to not impact performance in an undesired manner. Higher current demand from processing devices can also generate excess heat. Thus, the maximum power rating of the SoC may be based in part on the ability of the SoC to dissipate heat generated by the processing devices during their operation.

In exemplary aspects, the hierarchical power management system includes local area management (LAM) circuits distributed in the IC chip that are each associated with one or more processing devices in the IC chip. The LAM circuits are configured to generate power events associated with its monitored processing devices in the IC chip that represent power consumption associated with the monitored processing devices in the IC chip. The power events can be reported from local areas in the IC chip where power estimations for particular monitored processing devices are performed, to a centralized power estimation and limit (PEL) circuit in the hierarchical power management system. The PEL circuit is configured to estimate and control (i.e., throttle) power in the processor-based system in the IC chip to achieve a desired performance within an overall power budget for the IC chip. The PEL circuit determines how to throttle power based on the received power events. For example, the power events may be associated with estimations of power consumption that can be thought of as power throttle recommendations to throttle power in the IC chip if the estimated power consumption exceeds the power limits of the IC chip or negatively affects performance.

The activity of the processing devices in the IC chip affects its steady state and transient current (i) demand (i.e., change in current demand or current flow rate is often referred to as "di/dt"), and thus its power consumption. Because the IC chip may be larger in terms of die area due to the integration of the processing units and integrated supporting processing devices, there can be significant delay between when PEL circuit receives a power event regarding consumption of a monitored processing device and the PEL circuit throttling power in the IC chip to throttle power consumption in response. This delay can, for example, cause devices in the IC chip to temporarily continue to consume excess power that can cause thermal and/or power issues (e.g., di/dt issues, voltage droop, heat generation) before the power management circuit has time to react.

Mechanisms for addressing the above-noted issues may face additional challenges because the various processing devices reporting power telemetry data to the PEL circuit may employ different units, precisions, and dynamic ranges when measuring energy and/or electric charge. Accordingly, the PEL circuit must scale and/or convert power telemetry data received from different processing devices and aggregated over different time windows into a common ranges and units, before aggregating the data from the different processing devices for estimation for longer time windows. However, such scaling and conversion operations may require the use of multiplier circuits and/or divider circuits, which may increase the complexity of the SoC, consume additional processor resources, and negatively affect the overall performance of the SoC.

To convert power telemetry values (e.g., data received as part of the received power events) into common data formats, the PEL circuit in exemplary aspects disclosed herein is configured to receive an input power telemetry value from an input source circuit of the processor-based system of the IC chip. The input source circuit may comprise, as non-limiting examples, a LAM circuit of the IC, a regional activity management (RAM) circuit of the IC, a processing unit of the IC, or a power management IC (PMIC) of the IC. The input power telemetry value in some aspects may represent a measurement of one of capacitance, electric charge, energy, and current, as non-limiting examples. The PEL circuit converts the input power telemetry value into the common format power telemetry value. However, instead of performing multiplying or dividing the input power telemetry value by a power of 10 to convert it into the common format power telemetry value (which would require the use of a multiplier circuit and/or a divider circuit), the PEL circuit is configured to perform a bit shift operation on the input power telemetry value, effectively multiplying or dividing the input power telemetry value by a power of two (2). The common format power telemetry value is then stored as a value wherein a unit value represented by a least significant bit of the common format power telemetry value is greater than one (1) and is based on a quotient of the power of two (2) and a corresponding power of 10.

For instance, if the input power telemetry value comprises a micro-unit to be converted into a milli-unit (i.e., by dividing the input power telemetry value by $10^3$ or 1,000), the PEL circuit is configured to convert the input power telemetry value into the common format power telemetry value by performing a rightward bit shift of the input power telemetry value by 10 bits (i.e., dividing the input power telemetry value by $2^{10}$ or 1,024), with the unit value of the resulting common format power telemetry value being 1.024 based on the quotient of $2^{10}/10^3$. In aspects in which conversion from, e.g., a nano-unit to a milli-unit is required (i.e., by dividing the input power telemetry value by $10^6$ or 1,000,000), the PEL circuit is configured to convert the input power telemetry value into the common format power telemetry value by performing a rightward bit shift of the input power telemetry value by 20 bits (i.e., dividing the input power telemetry value by $2^{20}$ or 1,048,576), with the unit value of the resulting common format power telemetry value being 1.048 based on the quotient of $2^{20}/10^6$. Aspects in which the input power telemetry value comprises, for example, a pico-unit to be converted into a milli-unit (i.e., by dividing the telemetry value by $10^9$ or 1,000,000,000), the PEL circuit is configured to convert the input power telemetry value into the common format power telemetry value by performing a rightward bit shift of the input power telemetry value by 30 bits (i.e., dividing the input power telemetry value by $2^{30}$ or 1,073,741,824), with the unit value of the resulting common format power telemetry value being 1.073 based on the quotient of $2^{30}/10^9$.

The PEL circuit then aggregates the common format power telemetry value into an aggregated power telemetry value, by, e.g., summing the common format power telemetry value with a current value of the aggregated power telemetry value having the same unit value. The PEL circuit subsequently generates a power limiting management response to cause power consumption to be throttled in the IC chip based on the aggregated power telemetry value. In aspects in which an input source circuit may provide an input power telemetry value having a unit value that already matches the unit value of the aggregated power telemetry value (and thus may not require conversion), the PEL circuit may be configured to first determine whether a conversion of the input power telemetry value into a common format power telemetry value is required. In such aspects, the PEL circuit converts the input power telemetry value into the common format power telemetry value responsive to determining that the conversion of the input power telemetry value into the common format power telemetry value is required.

In some aspects, a firmware of the processor-based system may receive the aggregated power telemetry value (e.g., as a result of the PEL circuit reporting the aggregated power telemetry value to the firmware). The firmware may perform post-processing to convert the aggregated power telemetry value to a converted power telemetry value, wherein a unit value represented by a least significant bit of the converted power telemetry value is one (1). This may be accomplished in some aspects by multiplying the aggregated power telemetry value by the unit value of the aggregated power telemetry value. For example, if the unit value of a least significant bit of the aggregated power telemetry value is 1.024, the firmware may convert the aggregated power telemetry to the converted power telemetry value by multiplying the aggregated power telemetry value by 1.024. The converted power telemetry value may then be used by the firmware for other post-processing operations and/or estimations, configuration of configuration state registers (CSRs), and the like.

In this regard, FIG. 1 is a schematic diagram of an exemplary processor-based system 100 in the form of an exemplary system-on-a-chip (SoC) 102 in an integrated circuit (IC) chip 104 in which a hierarchical power management system can be provided. The SoC 102 may be employed in smaller, mobile devices (e.g., a cellular phone, a laptop computer), as well as enterprise systems such as server chips in computer servers. The processor-based system 100 is first described with regard to FIG. 1 before exemplary hierarchical power management systems that can be provided in the processor-based system 100 to estimate and throttle power consumption in the IC chip 104 are described starting at FIG. 2 below.

With reference to FIG. 1, the processor-based system 100 is provided in a single semiconductor die 106 so that the processor-based system 100 is integrated into a single IC chip 104. The processor-based system 100 includes a plurality of processing unit (PU) clusters 108(0)-108(N) that are examples of processing devices 110 in the processor-based system 100. The PU clusters 108(0)-108(N) each can include one or more processor cores 112(0)-112(N) each configured to execute instructions (e.g., software, firmware) to carry out tasks as is known for processors. For example, the PU clusters 108(0)-108(N) may be central processing unit (CPU) clusters wherein one or more of the processor cores 112(0)-112(N) includes CPUs and/or graphics processing unit (GPU) clusters, wherein one or more of the processor cores 112(0)-112(N) includes GPUs. The processor-based system 100 includes an internal communication network 114 that facilitates providing communication paths between the PU clusters 108(0)-108(N) and other supporting processing devices, that are also considered processing devices, to carry out desired processing requests and related processing tasks. The PU clusters 108(0)-108(N) are communicatively coupled to the internal communication network 114. The internal communication network 114 can be a coherent communication bus that provides a fabric in the processor-based system 100. The internal communication network 114 can be a network fabric that typically consists of network nodes and their communication lines, network of wires, and/or communication channels that provide communication paths that provide reliable communication between different PU clusters 108(0)-108(N) and the supporting processing devices 110. Network nodes are the circuits, such as interconnected switches and routers, that provide a reliable network fabric that provides and receives data on the communication paths between different PU clusters 108(0)-108(N) and the supporting processing devices 110. The fabric provided by the internal communication network 114 also includes a network of wires or communication channels that allow different processing devices in the processor-based system 100 to communicate and exchange data with each other at high speeds.

For example, as shown in FIG. 1, the processor-based system 100 also includes internal cache memory 116 and memory controllers (MCs) 118(0)-118(M) as other types of processing devices 110 that provide access to memory. The cache memory 116 shown in FIG. 1 is a shared cache memory that is communicatively coupled to the internal communication network 114 and can be accessed by the PU clusters 108(0)-108(N) through the internal communication network 114. The processor-based system 100 may also include private cache memory and/or private shared cache memory that is integrated or privately accessible by one or more of the respective PU clusters 108(0)-108(N) without having to access such through the internal communications network 114. The memory controllers 118(0)-118(M) are communicatively coupled to the internal communication network 114 in the IC chip 104. The memory controllers 118(0)-118(M) provide the PU clusters 108(0)-108(N) access to memory for storing and retrieving data to carry out processing tasks. For example, the memory controllers 118(0)-118(M) may be coupled to external memory from the IC chip 104 or internal memory integrated in the IC chip 104.

Also as shown in FIG. 1, the processor-based system 100 in this example also includes I/O interface circuits 120(0)-120(X) as other examples of processing devices 110 that are also communicatively coupled to the internal communication network 114. The I/O interface circuits 120(0)-120(X) provide access to I/O devices, which may be internal and integrated in the IC chip 104 or external to the IC chip 104. For example, the I/O interface circuits 120(0)-120(X) may be peripheral component interconnect (PCI) interface circuits that are used for connecting I/O hardware devices to a processor-based system, like the processor-based system 100 in FIG. 1, to allow high-speed data to be transferred between devices and the PU clusters 108(0)-108(N) in the processor-based system 100.

Also as shown in FIG. 1, the processor-based system 100 in this example also includes socket-to-socket (S2S) interface circuits 122(0)-122(Y) as other examples of processing devices 110 that are also communicatively coupled to the internal communication network 114. The S2S interface circuits 122(0)-122(Y) allow the processor-based system 100 to be coupled to another separate processor-based system (which may be like the processor-based system 100 in FIG. 1) in a socket-to-socket connection. For example, the processor-based system 100 shown in FIG. 1 may be a first CPU motherboard system that can be communicatively coupled to another processor-based system through the internal communication network 114 and a coupled S2S interface circuit 122(0)-122(Y).

Also as shown in FIG. 1, the processor-based system 100 in this example also includes other interface (I/F) circuits 127(0)-127(Z) as other examples of processing devices 110 that are also communicatively coupled to the internal communication network 114. The interface circuits 127(0)-127(Z) can provide an additional external communications interface to the SoC 102, and can be configured to provide a communication interface according to the desired standard or protocol. For example, the interface circuits 127(0)-127(Z) could be PCIe interface circuits that are configured to support PCIe communications with the SoC 102.

Thus, in the processor-based system 100 in FIG. 1, the internal communication network 114 enables different processing devices such as PU clusters 108(0)-108(N) and their processor cores 112(0)-112(N), caches, the memory controllers 118(0)-118(M), the I/O interface circuits 120(0)-120(X), and/or the S2S interface circuits 122(0)-122(Y) to work together efficiently. The fabric provided by the internal communication network 114 is designed to provide high bandwidth, low latency, and efficient routing of data between different processing devices of the processor-based system 100.

Also, as shown in FIG. 1 and as described in more detail below, the processor-based system 100 also includes a hierarchical power management system 124. In this example, the hierarchical power management system 124 is integrated into the same IC chip 104 and in the same die 106 that includes the PU clusters 108(0)-108(N) and the internal communication network 114. The hierarchical power management system 124 is configured to control power consumption of the processor-based system 100 by controlling power consumption of some or all of the processing devices 110 in the IC chip 104. The hierarchical power management system 124 is configured to control power consumption to achieve a desired performance within an overall power budget for the IC chip 104. For example, the processor-based system 100 may have an overall power budget that is based on the ability of the IC chip 104 to dissipate heat generated by the operation of the processor-based system 100. The processor-based system 100 may also have an overall power budget that is based on a current limit of power rails in the IC chip 104. The power budget of the processor-based system 100 may also be based on power supply limits of a power supply that is powering the processor-based system 100. Thus, the hierarchical power management system 124 can be configured to control power consumption by controlling the power level (e.g., voltage level, operating frequency) distributed at one or more of the power rails in the IC chip 104 that provide power to the processing devices 110. For example, the hierarchical power management system 124 can be configured to cause additional power to be supplied to certain power rails thereby supplying power to higher current demanding devices to achieve higher performance, while providing less power to other power rails to keep the overall power within power and/or thermal limits for the IC chip 104. For example, the hierarchical power management system 124 can be configured to communicate with or include a power management integrated circuit (PMIC) chip 125 (that can either be on-chip or off-chip to the SoC 102) to actually cause the power supplied to certain power rails to be adjusted.

Also, as discussed in more detail below, the hierarchical power management system 124 can also be configured to control power consumption in the processor-based system 100 by throttling performance (e.g., frequency and/or voltage) of the processing devices 110 in the processor-based system 100. Throttling may refer to any measure (for example, modifying a clock frequency, and/or a supply voltage) to effect (i.e., reduce, maintain, or increase) power consumption. This in turn throttles (i.e., reduces, maintains, or increases) the current demand of such processing devices 110 and thus their power consumption in the IC chip 104. Performance of clocked circuits in the processing devices 110 in the processor-based system 100 in terms of frequency (f) is related to power (P) according to the power equation $P = c\, f\, V^2$, where 'c' is capacitance and 'V' is voltage. Thus, reducing frequency and/or voltage of a clocked circuit in a processing device 110 in the processor-based system 100 also reduces its power consumption.

Figure 2:
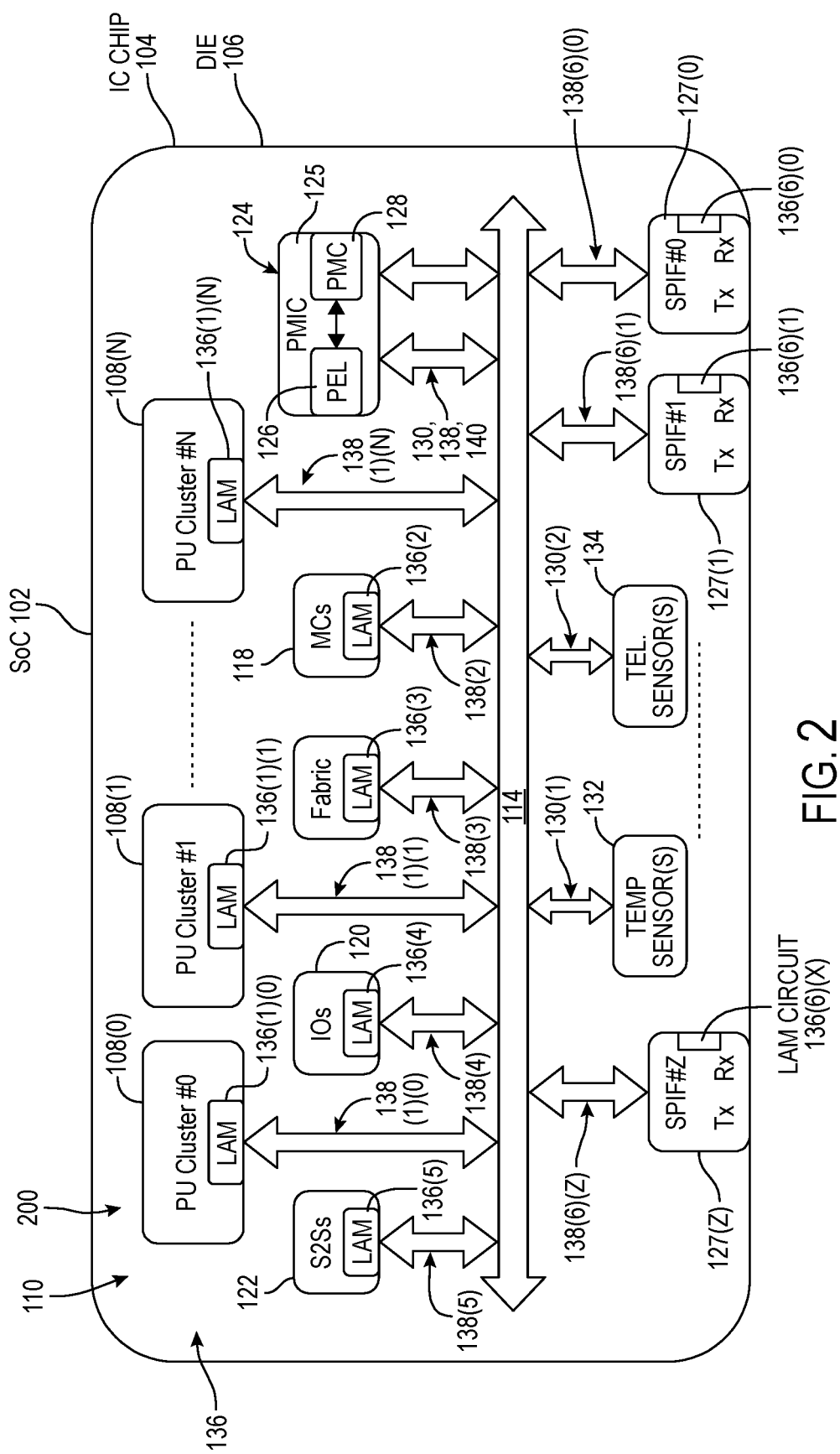
FIG. 2 is a logic diagram of the exemplary processor-based system in FIG. 1 illustrating processing circuits and other support devices communicatively coupled to an internal communication network, and a hierarchical power management system that is configured to perform power estimation and throttling of power consumption.

FIG. 2 is a logic diagram of the exemplary processor-based system 100 in FIG. 1 illustrating processing devices 110 communicatively coupled to the internal communication network 114, and the hierarchical power management system 124 to control power consumption in the IC chip 104. Common elements in the processor-based system 100 in FIGS. 1 and 2 are shown with common elements numbers and thus are not re-described. The IC chip 104 can also include target devices 200 whose control affects power, which can include the processing devices 110 and other circuits that are described below. As will be discussed in more detail below, the hierarchical power management system 124 is configured to throttle power to target devices 200 as well as processing devices 110 to throttle power consumption in the IC chip 104.

As also shown in FIG. 2, the hierarchical power management system 124 includes a centralized power estimation and limiting (PEL) circuit 126 that is configured to estimate power consumption in the IC chip 104 and take actions to limit or throttle power consumption in the IC chip 104. In this example, the PEL circuit 126 can be provided as part of a power management integrated circuit (PMIC) 125 that is integrated in the IC chip 104. The PEL circuit 126 may communicate such power throttling requests to a power management controller (PMC) 128, for example, that is configured to control power provided by voltage rails in the IC chip 104. Throttling power consumption can include both increasing power (e.g., increasing voltage to power rails) to increase power consumption for increased performance as well as decreasing power (e.g., decreasing voltage to power rails) to decrease power consumption. The hierarchical power management system 124 is configured to estimate power consumption in the IC chip 104 through receipt of power events 130 reported to it from devices at lower hierarchical levels in the IC chip 104 that provide information that provides an indirect indication of power consumption. For example, the IC chip 104 may have one or more temperature sensor(s) 132 that are configured to report thermal power events 130(1) to the PEL circuit 126 to provide an indication of the temperature in the IC chip 104 which can then be correlated to power consumption by the processor-based system 100 in the IC chip 104. As another example, the IC chip 104 may have one or more telemetry sensor(s) 134 (e.g., current sensors) that are configured to detect and report telemetry power events 130(2) to the PEL circuit 126 to provide an indication of the telemetry information in the IC chip 104 which can then also be correlated to power consumption by the processor-based system 100 in the IC chip 104.

The power consumption of the processing devices 110 in the processor-based system 100 contributes to the power consumption in the IC chip 104. Thus, it may be desired to also have a way for the PEL circuit 126 in the hierarchical power management system 124 to receive a direct indication of power consumption for the processing devices 110. The PEL circuit 126 can then also use this information to estimate power consumption in the IC chip 104 and use such information to throttle the power consumption in the IC chip 104. In this regard, as shown in FIG. 2, hierarchical power management system 124 also includes local area management (LAM) circuits 136 that are each associated with one or more processing devices 110 in the IC chip 104. The LAM circuits 136 could be placed in various places in the IC chip 104, including at corners of the IC chip 104 where power estimation and power limiting may need to be performed. For example, LAM circuits 136(1)(0)-136(1)(N) may be associated with one or more of the PU clusters 108(0)-108(N) as shown in FIG. 2. As another example, LAM circuits 136(2)-136(5), 136(6)(0)-136(6)(X) may also be associated with respective one or more of the memory controllers 118, the internal communication network 114, e.g., the fabric, one or more of the I/O interface circuits 120, the one or more of the S2S circuits 122, and/or one or more interface circuits 127(0)-127(Z). Each LAM circuit 136(2)-136(5), 136(6)(0)-136(6)(X) is configured to monitor the activity related to its associated processing device 110 as a monitored processing device 110 to then generate respective activity power events 138(1)(0)-138(1)(N), 138(2)-138(5), 138(6)(0)-138(6)(Z) that are communicated directly or indirectly to the PEL circuit 126. The activity power events 138(1)(0)-138(1)(N), 138(2)-138(5), 138(6)(0)-138(6)(Z) contain information that relates to power consumption of the respective monitored processing device 110. For example, the activity power events 138(1)(0)-138(1)(N), 138(2)-138(5), 138(6)(0)-138(6)(Z) could contain processing activity information, or power consumption information that is generated by the respective LAM circuits 136(1)(0)-136(1)(N), 136(2)-136(5), 136(6)(0)-136(6)(X) estimating power consumption of its monitored processing device 110 based on processing activity of its monitored processing device 110. In either case, in this manner, the activity power events 138 can be reported from local areas in the IC chip 104 where power estimations for particular monitored processing devices 110 are performed, to the centralized PEL circuit 126. The PEL circuit 126 can then be configured to use the received activity power events 138 and/or the other power events 130 to estimate and control (i.e., throttle) power in the processor-based system 100 in the IC chip 104 to achieve a desired performance within an overall power budget for the IC chip 104. For example, the activity power events 138 that are associated with estimations of power consumption of processing devices 110 that can be thought of in essence as power throttle recommendations to the PEL circuit 126 for the PEL circuit 126 to throttle power in the IC chip 104 if the estimated power consumption exceeds the power limits of the IC chip 104 or negatively affects performance in an undesired manner.

By the PEL circuit 126 being configured to receive activity power events 138 relating to activity for individual processing devices 110 in the processor-based system 100, this may also allow the PEL circuit 126 to throttle power consumption locally to certain processing devices 110 that are responsible for increased power consumption. This allows the PEL circuit 126 to throttle power with more discrimination rather than solely throttling power to power rails or in other ways in the IC chip 104 that affects the power delivered to a larger set of processing devices 110 as a whole. For example, as discussed in more detail below, the PEL circuit 126 can be configured to use the received activity power events 138 to perform performance throttling of processing devices 110 in the processor-based system 100 to throttle its power consumption. The PEL circuit 126 can be configured to generate power limiting management responses 140 to be communicated to certain LAM circuits 136 in the processor-based system 100 to cause such LAM circuits 136 to limit performance of its monitored processing device 110.

Performance throttling of a processing device 110 in the processor-based system 100 to throttle its power consumption can be accomplished in different manners. For example, as discussed in more detail below, performance throttling can be achieved by the PEL circuit 126 by generating a throughput throttling power limiting management response 140, which is destined for the LAM circuit 136(3) associated with the internal communication network 114. The LAM circuit 136(3) can be configured to throttle the throughput of communication traffic in the internal communication network 114, such as at a particular network node in the internal communication network 114, to throttle current demand in the internal communication network 114 and thus its power consumption. Throughput throttling can be isolated to only certain areas or network nodes in the internal communication network 114. In another example, as discussed in more detail below, performance throttling in the processor-based system 100 can be achieved by the PEL circuit 126 by generating a clock throttling power limiting management response 140 to cause a clock circuit (which may be clocking one or more of the processing devices 110) to throttle the speed (i.e., clock frequency) of certain clocked processing devices 110. Clock throttling of a processing device 110 throttles its current demand which throttles its power consumption. In another example, as discussed in more detail below, performance throttling in the processor-based system 100 can be achieved by throttling or changing power states of a monitored processing device 110 to throttle its performance and thus its power consumption.

Figure 3:
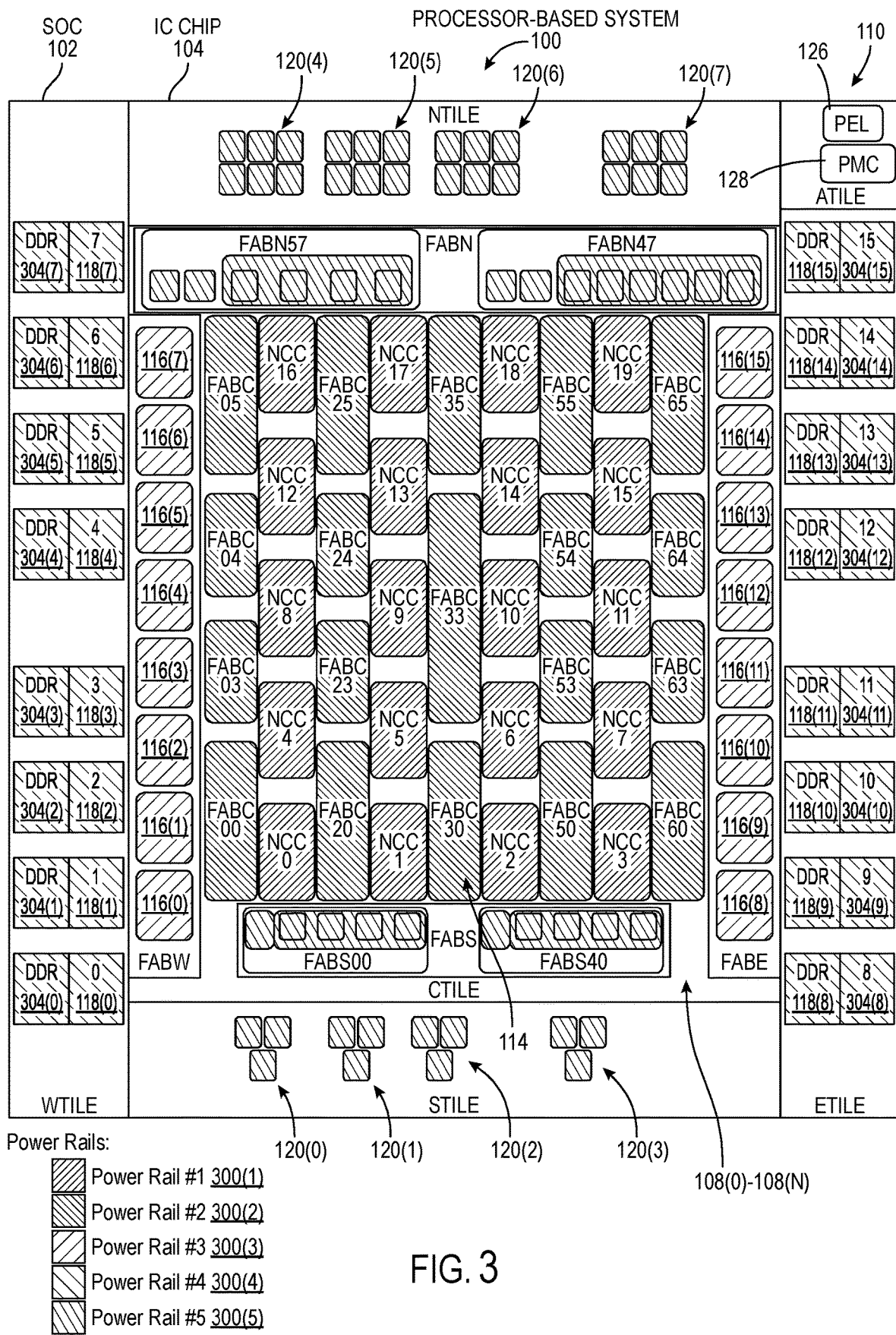
FIG. 3 is a top view of an exemplary physical layout of the semiconductor die ("die") that is an SoC in an IC chip of the processor-based system in FIG. 1 illustrating the physical layout of different tile regions and the devices physically present in such different tile regions, and coded with indicia indicating which devices are powered from separate power rails supplied with power from the hierarchical power management system.

FIG. 3 is a top view of an exemplary physical layout the semiconductor die ("die") 102 of the IC chip 104 in FIG. 1 that includes the processor-based system 100 to illustrate further exemplary details of the physical layout of the hierarchical power management system 124 and an exemplary organization of power rails provided in the processor-based system 100.

As shown in FIG. 3, the IC chip 104 has a physical layout that includes a center tile CTILE, a west tile WTILE, an east tile ETILE, a south tile STILE, a north tile NTILE, and an A-tile ATILE. A tile is a smaller section of a semiconductor die that has been processed in a wafer process and contains a set of IC components. The center tile CTILE in this example includes the PU clusters 108(0)-108(N), shown as NCC0-NCC19. Different numbers of processor cores can be provided in different PU clusters 108(0)-108(N), NCC0-NCC19. In this example, the PU clusters 108(0)-108(N), NCC0-NCC19 are all powered by a same power rail 300(1). The center tile CTILE in this example also includes the internal communication network 114, which is shown by a plurality of center network nodes FABC00-FABC65. The network nodes FABC00-FABC65 are circuits that create a network fabric ("fabric") of communication paths between the different PU clusters 108(0)-108(N) and the supporting processing devices 110. In this example, the network nodes FABC00-FABC65 are powered by a second power rail 300(2). The network nodes FABC00-FABC65 are circuits that can include interconnected switches and/or routers, that provide a reliable network fabric that provides and receives data on the internal communications network 104 between different PU clusters 108(0)-108(N) and the supporting processing devices 110. The center tile CTILE in this example also includes the system level cache memory 116(0)-116(7) powered by a third power rail 300(3) to provide shared cache memory 116 for the PU clusters 108(0)-108(N), NCC0-NCC19. The system level cache memory 116(0)-116(7) that is organized into different quadrants adjacent to and coupled to respective memory circuits DDR0-DDR7 that include respective memory controllers 118(0)-118(7) and coupled memory 304(0)-304(7) (e.g., dynamic data random access memory (DDR) circuits) in the west tile WTILE to provide memory interlacing schemes for example. The memory circuits DDR0-DDR7 may be powered by yet a separate, fourth power rail 300(4). The memory circuits DDR0-DDR7 are also communicatively coupled to the internal communication network 114 through the respective network nodes FABC00-FABC05.

With continuing reference to FIG. 3, the center tile CTILE in this example also includes the system level cache memory 116(8)-116(15), also powered by the third power rail 300(3), to provide additional shared cache memory 116 for the PU clusters 108(0)-108(N), NCC0-NCC19. The system level cache memory 116(8)-116(15) may be organized into different quadrants adjacent to respective memory circuits DDR8-DDR15 that include respective memory controllers 118(8)-118(15) and coupled memory 304(8)-304(15) (e.g., DDR circuits) in the east tile ETILE to provide memory interlacing schemes for example. The memory circuits DDR8-DDR15 are also shown as being powered by the same fourth power rail 300(4) as is powering the memory circuits DDR0-DDR7 in the west tile WTILE. The memory circuits DDR8-DDR15 are also communicatively coupled to the internal communication network 114 through the respective network nodes FABC60-FABC65.

With continuing reference to FIG. 3, the center tile CTILE of the IC chip 104 in this example includes request node circuits FABS00, FABS40, FABN57, FABN47 that are coupled to the internal communication network 114 to provide network interfaces between the I/O interface circuits 120(0)-120(3), 120(4)-120(7) and the internal communication network 114 in the respective south tile STILE and north tile NTILE. The request node circuits FABS00, FABS40, FABN57, FABN47 manage the traffic requests from the I/O interface circuits 120(0)-120(3), 120(4)-120(7) to the internal communication network 114 and vice versa. The request node circuits FABS00, FABS40, FABN57, FABN47 and the I/O interface circuits 120(0)-120(3), 120(4)-120(7) in this example are powered by a fifth power rail 300(5).

With continuing reference to FIG. 3, the A-tile ATILE in the IC chip 104 includes the PEL circuit 126 and the PMC 128 of the hierarchical power management system 124 in this example.

Thus, as shown in FIG. 3, the processing devices 110 in the processor-based system 100 in the IC chip 104 are powered by a series of different power rails 300(1)-300(5). Thus, the PEL circuit 126 in the hierarchical power management system 124 has the resolution of each of these different power rails 300(1)-300(5) in which to vary the voltage on such power rails 300(1)-300(5) to throttle power consumption in the IC chip 104 based on the power events 130, 138. Note that each power rail 300(1)-300(5) can actually be included as a single or multiple power rails.

Figure 4:
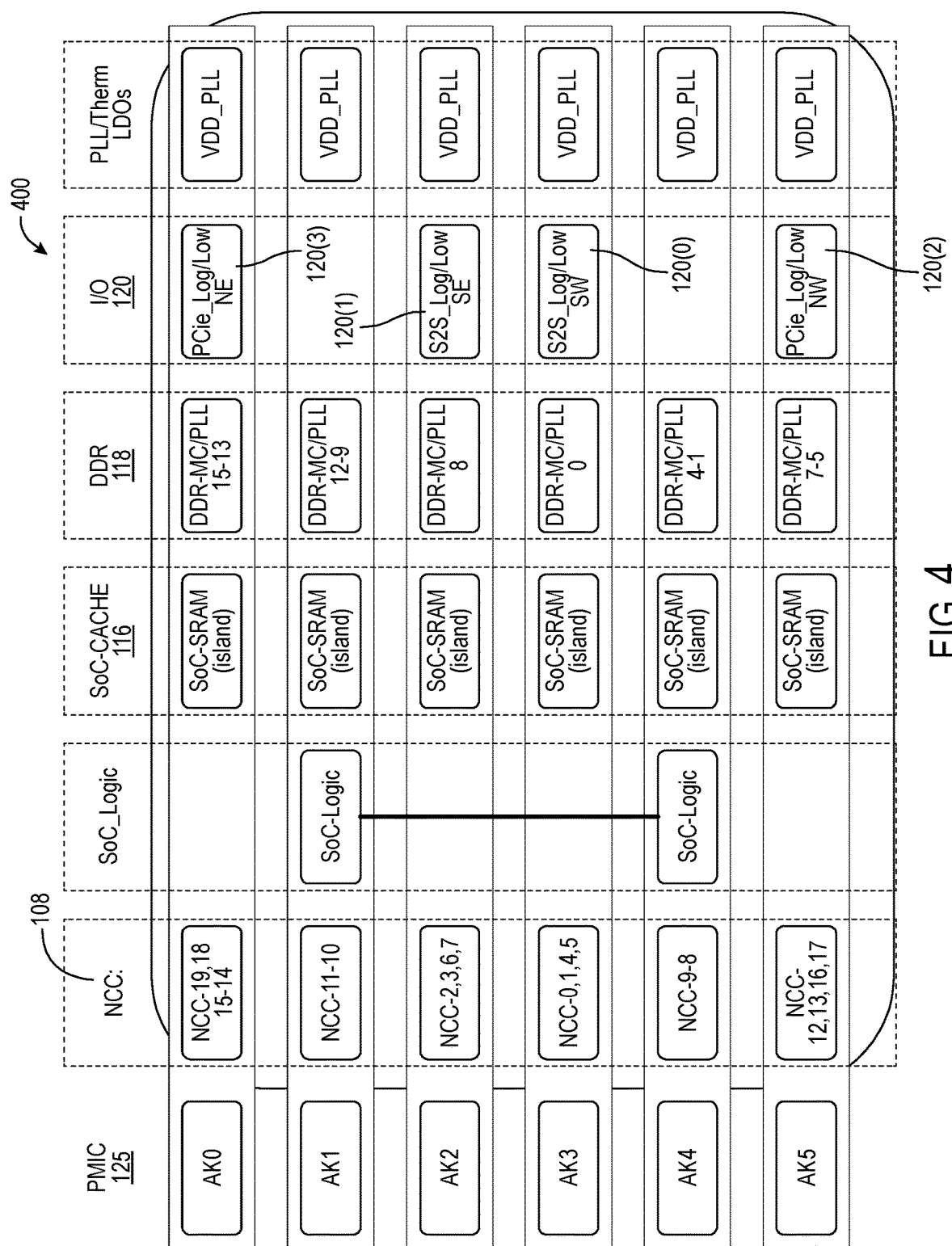
FIG. 4 is a table illustrating an exemplary assignment of power rails driven by respective power management ICs (PMIC) in the processor-based system in FIG. 1, to devices in the processor-based system for supplying power to such devices.

FIG. 4 is a table 400 illustrating an exemplary assignment of power management circuits AK0-AK5 in the PMIC 125 in the processor-based system 100, to devices in the processor-based system 100 for supplying power to such devices. Power management circuits AK0-AK5 can be responsible to control one or more different power rails 300(1)-300(5) as shown in FIG. 3 to supply power to various components. Multiple devices in the processor-based system 100 can be coupled to the same power rail 300(1)-300(5) to receive power. For example, as shown in FIG. 4, in this example, PU clusters NCC19, 18, 15, 14 are powered from power rails controlled by power management circuit AK0, PU clusters NCC 11-10 are powered from power rails controlled by power management circuit AK1, PU clusters NCC2, 3, 6, 7 are powered from power rails controlled by power management circuit AK2, PU clusters NCC0, 1, 4, 5 are powered from power rails controlled by power management circuit AK3, PU clusters NCC9-8 are powered from power rails controlled by power management circuit AK4, and PU clusters NCC12, 13, 16, 17 are powered from power rails controlled by power management circuit AK5. Also, as shown in FIG. 4, a single device in the processor-based system 100 can be coupled to more than one power rail to receive power. For example, power supplied to the logic circuits (SoC_Logic) can be controlled by the multiple power management circuits AK1-AK4. The cache memory 116 can be supplied power from power rails controlled by the power management circuits AK0-AK5. Different memory controllers 118 are shown as being powered by power rails controlled by the power management circuits AK0-AK5. The I/O interface circuits 120(0)-120(3) are shown as being powered by power rails controlled by separate respective power management circuits AK3, AK2, AK5, AK0.

Figure 5:
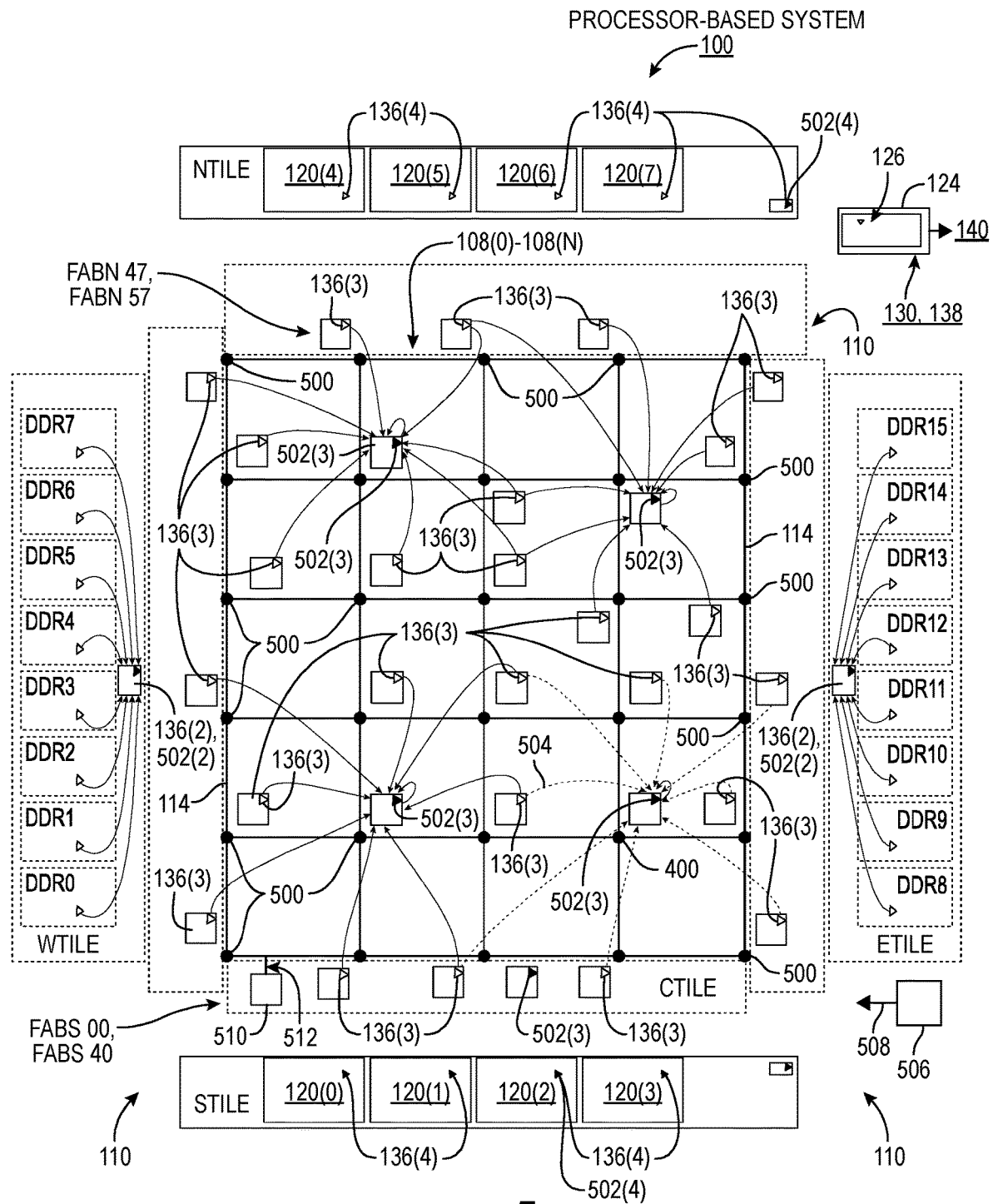
FIG. 5 is another top view of the processor-based system in the IC chip in FIG. 1 illustrating local area management (LAM) circuits, regional area management (RAM) circuits, and a power estimation and limiting (PEL) circuit as part of a hierarchical power management system, wherein the hierarchical power management system is configured to locally monitor activity of devices in the processor-based system to estimate and throttle its power consumption and report activity power events regarding estimated power consumption to the PEL circuit, wherein the PEL circuit is configured to collect activity power events regarding power consumption of the monitored processing devices and throttle power in the IC chip in response.

FIG. 5 is another top view of the processor-based system 100 in the IC chip 104 in FIG. 1 illustrating the local area management (LAM) circuits 136, and the PEL circuit 126 as part of the hierarchical power management system 124. As discussed above with regard to FIG. 2, the LAM circuits 136 are configured to locally monitor activity of processing devices 110, such as the PU clusters 108(0)-108(N) in the processor-based system 100 to estimate and throttle its power consumption and report activity power events 138 regarding estimated power consumption to the PEL circuit 126. The processor-based system 100 in this example includes a clock circuit 506 that generates a clock signal 508 to clock the PU clusters 108(0)-108(N) to control the speed of the PU clusters 108(0)-108(N). The PEL circuit 126 is configured to collect activity power events 138 regarding power consumption of the monitored processing devices 110 and issue power limiting management responses 140 in response to throttle power consumption in the IC chip 104.

As shown in FIG. 5, a plurality of LAM circuits 136(3) are distributed in the center tile CTILE and associated with respective network node 500 (as processing devices 110) of the internal communication network 114.) For example, the internal communication network 114 can be a mesh network like shown in FIG. 5. The internal communication network 114 is capable of routing communication traffic from the PU clusters 108(0)-108(N) through different network nodes 500 based on performance and traffic characteristics of the internal communication network 114. In this manner, the throughput of the internal communication network 114 is not limited by any single network node 500. The processor-based system 100 in this example includes a clock circuit 510 that generates a clock signal 512 to clock the network nodes 500 to control the speed of the internal communication network 114. The clock circuit 510 is another example of a target device 200 in the IC chip 104. As will be discussed in more detail below, the LAM circuits 136(3) associated with the network nodes 500 in the internal communication network 114 are configured to sample processing activity of respective assigned network nodes 500 to generate a plurality of activity samples. The LAM circuits 136(3) are then configured to estimate power consumption of the assigned network node 500 based on the activity samples regarding its assigned network node 500 to generate an activity power event 138 based on such estimated power consumption of the respective network node 500.

Also, as shown in FIG. 5, in this example, the hierarchical power management system 124 also includes regional activity management (RAM) circuits 502(3) configured to monitor activity of the internal communication network 114. The RAM circuits 502(3) are located in a particular region of the internal communication network 114 with each being assigned and coupled to a subset of the LAM circuits 136(3). The RAM circuits 502(3) are intermediate power management circuits in the hierarchical power management system 124. The RAM circuits 502(3) are coupled to the PEL circuit 126 through a second communication network 504. The RAM circuits 502(3) are communicatively and hierarchically located between the LAM circuits 136(3) and the centralized PEL circuit 126. The RAM circuits 502(3) are configured to receive and aggregate activity power events 138 reported by assigned LAM circuits 136(3) regarding activity of their monitored network node 500. The RAM circuits 502(3) can then aggregate these activity power events 138 and report an aggregated activity power event to the PEL circuit 126 so that the PEL circuit 126 can determine how power consumption of network nodes 500 should be throttled to achieve a desired overall performance of the internal communication network 114 while also maintaining power consumption within desired limits. The PEL circuit 126 can communicate a power limiting management response 140 back to a given RAM circuit 502(3) to perform throughput throttling of a given network node(s) 500 in response to the power consumption of a network node(s) 500 being determined to exceed desired limits. For example, as discussed in more detail below, the RAM circuit 502(3) can be configured to throttle throughput of a given network node(s) 500 by selectively enabling and disabling communication traffic through the network node(s) 500.

Also, as shown in FIG. 5, in this example, a plurality of LAM circuits 136(2) are distributed in the west tile WTILE and the east tile ETILE and associated with respective memory circuits DDR0-DDR7, DDR8-DDR15 (as processing devices 110). As will also be discussed in more detail below, the LAM circuits 136(2) associated with the memory circuits DDR0-DDR7, DDR8-DDR15 are configured to sample processing activity of respective assigned memory circuits DDR0-DDR7, DDR8-DDR15 to generate a plurality of activity samples. The LAM circuits 136(2) are then configured to estimate power consumption of the assigned memory circuit DDR0-DDR7, DDR8-DDR15 based on the activity samples regarding their assigned network node 500 to generate an activity power event 138 based on such estimated power consumption of the respective memory circuits DDR0-DDR7, DDR8-DDR15.

Also, as shown in FIG. 5, in this example, the hierarchical power management system 124 also includes RAM circuits 502(2) configured to monitor activity of the memory circuits DDR0-DDR7, DDR8-DDR15. The RAM circuits 502(2) are located in a particular region of the memory circuits DDR0-DDR7, DDR8-DDR15 with each being assigned and coupled to a subset of the LAM circuits 136(2). The RAM circuits 502(2) are communicatively and hierarchically located between the LAM circuits 136(2) and the centralized PEL circuit 126. The RAM circuits 502(2) are coupled to the PEL circuit 126 through the second communication network 504. The RAM circuits 502(2) are configured to receive and aggregate activity power events 138 reported by assigned LAM circuits 136(2) regarding activity of their monitored memory circuits DDR0-DDR7, DDR8-DDR15. The RAM circuits 502(2) can then aggregate these activity power events 138 and report an aggregated activity power event to the PEL circuit 126 so that the PEL circuit 126 can determine how power consumption of the memory circuits DDR0-DDR7, DDR8-DDR15 should be throttled to achieve a desired overall performance of the memory circuits DDR0-DDR7, DDR8-DDR15 while also maintaining power consumption within desired limits. The PEL circuit 126 can communicate a power limiting management response 140 back to a given RAM circuit 502(2) to perform throughput and/or performance throttling of a given memory circuit(s) DDR0-DDR7, DDR8-DDR15 in response to the power consumption of a memory circuit DDR0-DDR7, DDR8-DDR15 being determined to exceed desired limits. For example, as discussed in more detail below, the RAM circuit 502(2) can be configured to throttle throughput and/or performance of a given memory circuit(s) DDR0-DDR7, DDR8-DDR15 by selectively enabling and disabling memory access requests/responses to the memory circuits DDR0-DDR7, DDR8-DDR15.

Also, as shown in FIG. 5, in this example, the hierarchical power management system 124 also includes RAM circuits 502(4) configured to monitor activity of the I/O interface circuits 120(0)-120(7). The RAM circuits 502(4) are located in a particular region of the I/O interface circuits 120(0)-120(7) with each being assigned and coupled to a subset of the LAM circuits 136(4) as shown. The RAM circuits 502(4) are communicatively and hierarchically located between the LAM circuits 136(4) and the centralized PEL circuit 126. The RAM circuits 502(4) are coupled to the PEL circuit 126 through the second communication network 504. The RAM circuits 502(4) are configured to receive and aggregate activity power events 138 reported by assigned LAM circuits 136(4) regarding activity of their monitored I/O interface circuits 120(0)-120(7). The RAM circuits 502(4) can then aggregate these activity power events 138 and report an aggregated activity power event to the PEL circuit 126 so that the PEL circuit 126 can determine how power consumption of the I/O interface circuits 120(0)-120(7) should be throttled to achieve a desired overall performance of the I/O interface circuits 120(0)-120(7) while also maintaining power consumption within desired limits. The PEL circuit 126 can communicate a power limiting management response 140 back to a given RAM circuit 502(4) to perform throughput and/or performance throttling of a given I/O interface circuit(s) 120(0)-120(7) in response to the power consumption of an I/O interface circuit(s) 120(0)-120(7) being determined to exceed desired limits. For example, as discussed in more detail below, the RAM circuit 502(4) can be configured to throttle throughput and/or performance of a given I/O interface circuit(s) 120(0)-120(7) by selectively enabling and disabling access requests/responses to the I/O interface circuit(s) 120(0)-120(7).

As shown back in FIG. 2, LAM circuits 136(1)(0)-136(1)(N) can also be associated with each PU cluster 108(0)-108(N) in the processor-based system 100 to sample activity therein to estimate power consumption in a respective PU cluster 108(0)-108(N). The LAM circuits 136(1)(0)-136(1)(N) can be configured to generate activity power events 138 that includes the estimated power consumptions in response to a RAM circuit 502, which in turn aggregates such activity power events 138 to the PEL circuit 126. The RAM circuits 502 assigned to the subset of LAM circuits 136(1)(0)-136(1)(N) are coupled to the PEL circuit 126 through the second communication network 504. The PEL circuit 126 can generate power limiting management responses 140 in response to throttle the performance of the PU clusters 108(0)-108(N).

As also shown in FIG. 2, LAM circuits 136(5) can also be associated with each S2S interface circuit 122(0)-122(Y) in the processor-based system 100 to sample activity therein to estimate power consumption in a respective S2S interface circuit 122(0)-122(Y). The LAM circuits 136(5) can be configured to generate activity power events 138 that includes the estimated power consumptions in response to a RAM circuit 502, which in turn aggregates such activity power events 138 to the PEL circuit 126. The RAM circuits 502 assigned to the subset of LAM circuits 136(5) are coupled to the PEL circuit 126 through the second communication network 504. The PEL circuit 126 can generate power limiting management responses 140 in response to throttle the performance of the S2S interface circuits 122(0)-122(Y).

As shown back in FIG. 2, LAM circuits 136(6)(0)-136(6)(X) can also be associated with each interface circuit 127(0)-127(Z) in the processor-based system 100 to sample activity therein to estimate power consumption in a respective interface circuit 127(0)-127(Z). The LAM circuits 136(6)(0)-136(6)(X) can be configured to generate activity power events 138 that includes the estimated power consumptions in response to a RAM circuit 502, which in turn aggregates such activity power events 138 to the PEL circuit 126. The RAM circuits 502 assigned to a subset of LAM circuits 136(6)(0)-136(6)(X) is coupled to the PEL circuit 126 through the second communication network 504. The PEL circuit 126 can generate power limiting management responses 140 in response to throttle the performance of the interface circuits 127(0)-127(Z).

In this example, any of the RAM circuits 502, 502(2)-504(4) discussed above can also include circuitry to behave functionally as a LAM circuit for an assigned processing device 110. In this regard, any of the RAM circuits 502, 502(2)-504(4) can also be configured to sample the processing activity of its respective assigned processing device 110 to generate a plurality of activity samples for such processing device 110. Such RAM circuits 502, 502(2)-504(4) can be configured to estimate power consumption of its assigned processing device 110 based on the activity samples regarding its assigned processing device 110 to generate an aggregated activity power event based on such estimated power consumption of the respective processing device 110 and the other received activity power events 138 from its coupled LAM circuits 136(1)(0)-(1)(N), 136(2)-136(5), 136(6)(0)-136(6)(X).

Note that in any of the above referenced examples, the RAM circuits 502 are optional for any of the monitored processing devices 110, and their respective LAM circuits 136(1)-136(6) can be configured to directly communicate activity power events 138 directly to the PEL circuit 126.

Figure 6:
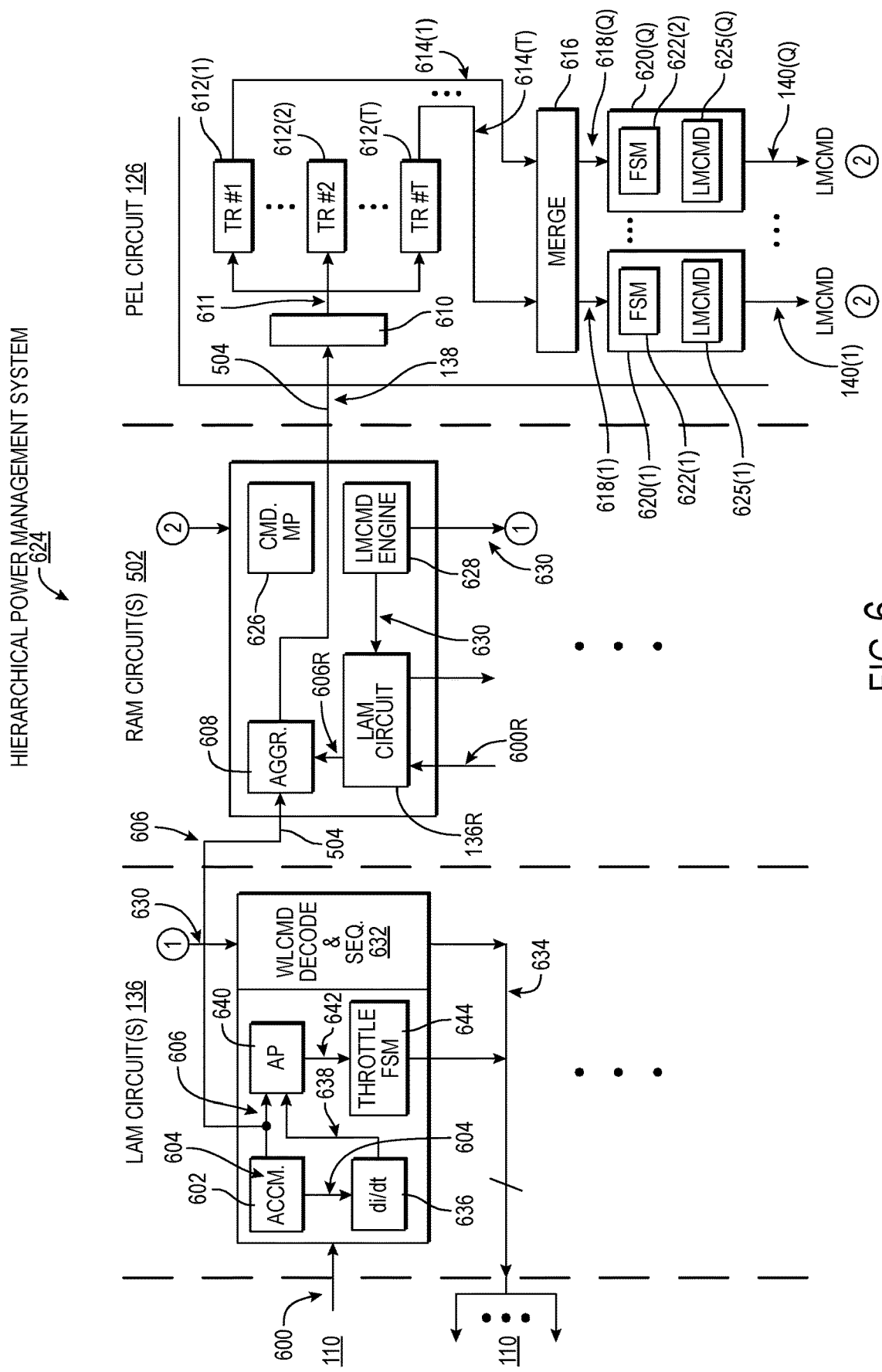
FIG. 6 is a schematic diagram of an exemplary three (3) level hierarchical power management system that can be provided in the processor-based system in the IC chip in FIG. 1, wherein the three (3) level hierarchical power management system includes: a first local level of LAM circuits configured to perform local device monitoring and power consumption throttling, and reporting activity power events regarding monitored processing device power consumption, a second, intermediate level of RAM circuits configured to receive and aggregate local activity power events, and a third, centralized level of a PEL circuit configured to collect aggregated activity power events regarding power consumption of the monitored processing devices and throttle power in the IC chip in response.

FIG. 6 is a schematic diagram illustrating additional exemplary detail of a three (3) level hierarchical power management system 624 that can be provided as the hierarchical power management system 124 in the processor-based system 100 in the IC chip 104 in FIGS. 1-3 and 5. Common elements between the hierarchical power management system 624 in FIG. 6 and the hierarchical power management system 124 in FIGS. 1-3 and 5 are shown with common element numbers. In this regard, FIG. 6 illustrates a single LAM circuit 136 communicatively coupled to a single RAM circuit 502 which is coupled to the PEL circuit 126. Note however that this is to simplify the illustration in FIG. 6. In the hierarchical power management system 624 in FIG. 6, there can be a plurality of RAM circuits 502 that are communicatively coupled to the PEL circuit 126. There can also be a plurality of LAM circuits 136 that are communicatively coupled to each RAM circuit 502 of the plurality of RAM circuits 502. The discussion below regarding the exemplary operation of the LAM circuit 136 and RAM circuit 502 are equally applicable to any number of LAM circuits and RAM circuits included in the processor-based system, including the LAM circuits 136(1)(0)-(1)(N), 136(2)-136(5), 136(6)(1)-136(6)(X) and the RAM circuits 502, 502(2)-502(4).

With reference to FIG. 6, the LAM circuit 136 in this example is configured to sample the processing activity as a received activity sample 600 of an assigned, monitored processing device 110 in each cycle of a given local time window. The LAM circuit 136 periodically samples activity of its monitored processing device 110 in a local time window representing the activity of the assigned, monitored processing device 110 in that local time window. In this example, the LAM circuit 136 is configured to correlate received activity samples 600 into a power consumption during a given local time window for the activity of the processing device 110 for that given local time window. The LAM circuit 136 includes an accumulate circuit 602 that is configured to accumulate the estimated power consumptions based on the received activity samples 600 sampled in a given local time window to generate an estimated current demand 604 for the monitored processing device 110 for the local time window. The estimated current demand 604 is an estimate of the accumulated current measurement reported by the assigned processing device 110 (i.e., power consumption) over the local time window. The accumulate circuit 602 then provides the estimated current demand 604 (current demand over time) for each local time window in a generated activity power event 606 on the second communication network 504 representing the estimated power consumption of the monitored processing device 110 that is communicated to the RAM circuit 502 assigned to the LAM circuit 136. The accumulate circuit 602 repeats the same process for subsequent local time windows to accumulate the estimated power consumptions for received activity samples 600 during the local time window to generate a next estimated current demand 604 for the monitored processing device 110.

With continuing reference to FIG. 6, the RAM circuit 502 includes an aggregation circuit 608 that is configured to aggregate the received activity power events 606 from its coupled LAM circuits 136 into a generated aggregated activity power event 138. The RAM circuit 502 is then configured to communicate the aggregated activity power event 138 on the second communication network 504 to the PEL circuit 126. Note that in this example, the RAM circuit 502 also includes its own LAM circuit 136R that may be configured like the LAM circuit 136 in FIG. 6. In this regard, the LAM circuit 136R is configured to sample the processing activity 600R of an assigned processing device 110 into a plurality of activity samples 600R. The processing activity 600R of the assigned processing device 110 is sampled periodically by the LAM circuit 136R to generate a plurality of activity samples over a given local time window representing the activity of the assigned, monitored processing device 110. The LAM circuit 136R is configured to determine a current flow rate and/or change in current flow rate (i.e., di/dt) of the assigned processing device 110 represented by the received plurality of activity samples 600R. The LAM circuit 136R can be programmed to correlate processing activity to power consumption to estimate the power consumption of the monitored processing device 110 over the local time window. The LAM circuit 136R can then be configured to generate an activity power event 606R representing the estimated power consumption of the monitored processing device 110 that is communicated to the aggregation circuit 608 of the RAM circuit 502 to be aggregated into the aggregated activity power event 138.

With continuing reference to FIG. 6, the PEL circuit 126 is configured to receive the aggregated activity power events 138 from the one or more RAM circuits 502 included in the hierarchical power management system 624. In this example, the PEL circuit 126 includes a decode circuit 610 that is configured to decode the received aggregated activity power events 138 into a decoded activity power events 611 to be routed to a corresponding activity tracker circuit 612(1)-612(T) that are each associated with a monitored processing device 110 in the processor-based system 100. The PEL circuit 126 can also include other energy tracker circuits (not shown) that are associated with other power events (e.g., temperature, droop detection) that can also affect how the PEL circuit 126 decides to throttle power. The activity tracker circuits 612(1)-612(T) are configured to aggregate associated activity power events 138 for an assigned monitored processing device 110 to determine whether power consumption for a monitored processing device 110 exceeds a defined threshold current flow rate/change in current flow rate. The activity tracker circuits 612(1)-612(T) can also each include a power limit management policy that is configured to generate respective power throttle recommendations 614(1)-614(T) for the PEL circuit 126 to use to determine how to throttle the distributed power and/or performance of the monitored processing devices 110 to throttle power consumption.

With continuing reference to FIG. 6, the PEL circuit 126 also includes a merge circuit 616 that merges the power throttle recommendations 614(1)-614(T) for the individual monitored processing devices 110 into merged power throttle recommendations 618(1)-618(Q). The merged power throttle recommendations 618(1)-618(Q) are provided to respective assigned target circuits 620(1)-620(Q). Each target circuit 620(1)-620(Q) is associated with a different target device 200 in the processor-based system 100 in which the PEL circuit 126 can issue power limiting management responses 140(1)-140(Q) to limit the power consumption of such target device 200. The target devices 200 are devices in the IC chip 104 whose operational control (e.g., operating voltage, frequency, workload) can affect power consumption in the IC chip 104. The target devices in the IC chip 104 can include more than just the processing devices 110 in the processor-based system 100. For example, the target devices 200 can include the power rails 300(1)-300(5) as shown in FIG. 3 and/or any of the processing devices 110 in the processor-based system 100. The PEL circuit 126 can be programmed to map (e.g., through firmware, electronic fuses, etc.) the merged power throttle recommendations 618(1)-618(Q) to a particular target device 200, and thus a target circuit 620(1)-620(Q), that may not directly correlate to each other. For example, it may be desired for the PEL circuit 126 to throttle power consumption of the I/O interface circuits 120(0)-120(X) by not only throttling power consumption for the I/O interface circuits 120(0)-120(X) but also by throttling power of the PU clusters 108(0)-108(N) that may be contributing to the power consumption by the I/O interface circuits 120(0)-120(X). In this manner, the merged power throttle recommendations 618(1)-618(Q) and/or other power events related to power issues and power consumption in the IC chip 104 can be mapped in the PEL circuit 126 to correlate to different target devices 200 for throttling power consumption. The merge circuit 616 can be programmed in a "many-to-many mapping" to correlate to different power limiting management responses within the IC chip 104 in the desired manner for more flexibility in managing power consumption in the IC chip 104 while still achieving the desired performance. In this manner, the power throttling management behavior of the PEL circuit 126 can be configured and changed even after the IC chip 104 is deployed in an application.

With continuing reference to FIG. 6, the target circuits 620(1)-620(Q) are each configured to determine if the power consumption of an associated target device 200 in the processor-based system 100 should be throttled based on the merged power throttle recommendations 618(1)-618(Q) provided to the target circuits 620(1)-620(Q). The target circuits 620(1)-620(Q) can each include finite state machine (FSM) circuits 622(1)-622(Q) that are configured to analyze the respective received merged power throttle recommendation 618(1)-618(Q) to determine if power consumption of an associated target device 200 should be throttled. If a FSM circuit 622(1)-622(Q) determines that power consumption of an associated target device 200 in the processor-based system 100 should be throttled, the FSM circuit 622(1)-622(Q) cause an associated power limiting command generation circuit 625(1)-625(Q) to generate a power limiting management response 140(1)-140(Q) to cause the power consumption of a target device 200 associated with the power limiting management response 140(1)-140(Q) to limit power consumption.

For example, if the target circuit 620(1)-620(Q) is assigned to a target device 200 of a power rail 300(1)-300(5), the target circuit 620(1)-620(Q) can be configured to determine how to throttle the voltage to the associated power rail 300(1)-300(5) to control power consumption of processing devices 110 powered by such power rail 300(1)-300(5). The respective power limiting command generation circuit 625(1)-625(Q) can be configured to generate a performance throttling power limiting management response 140(1)-140(Q) to cause the voltage provided to the associated power rail 300(1)-300(5) to be throttled to control power consumption of processing devices 110 powered by such associated power rail 300(1)-300(5).

In another example, if the target circuit 620(1)-620(Q) is assigned to a target device 200 such as the internal communication network 114, the target circuit 620(1)-620(Q) can be configured to determine how to throttle performance of the internal communication network 114 to control power consumption of the internal communication network 114. For example, to throttle the throughput performance of the internal communication network 114, the target device 200 may be the clock circuit 506 (FIG. 5) that is configured to clock the internal communication network 114. The clock circuit 506 is another example of a target device 200 in the IC chip 104. The target circuit 620(1)-620(Q) can determine a throttle frequency of the clock signal 508 generated by the clock circuit 506 (FIG. 5) for generating a clock throttling power limiting management response 140(1)-140(Q). The clock throttling power limiting management response 140(1)-140(Q) will cause the clock signal 508 to be throttled, which will in turn throttle the speed and the throughput performance of the internal communication network 114 and thus its power consumption and/or other circuits clocked by the clock signal 508.

In another example, if the target circuit 620(1)-620(Q) is assigned to a target device 200 as a PU cluster 108(0)-108(N) or any other processing device 110, the target circuit 620(1)-620(Q) can be configured to determine how to throttle performance of the internal communication network 114 to control power consumption of the internal communication network 114. For example, to throttle performance of the PU cluster 108(0)-108(N) or other processing device 110, the target device 200 may also be the clock circuit 506 (FIG. 5) that is configured to clock the PU clusters 108(0)-108(N). The target circuit 620(1)-620(Q) can determine a throttle frequency of the clock signal 508 generated by the clock circuit 506 for generating a performance power limiting management response 140(1)-140(Q). The clock throttling power limiting management response 140(1)-140(Q) will cause the clock signal 508 to be throttled, which will in turn throttle the performance of the PU clusters 108(0)-108(N) or other processing devices 110.

As shown in FIG. 6, in this example, to communicate the power limiting management responses 140(1)-140(Q) generated by the PEL circuit 126 to effect a power throttling of a target device 200 in the processor-based system 100, the power limiting management responses 140(1)-140(Q) are communicated to a target device 200 in the processor-based system 100. For target devices 200 that are monitored processing devices 110 monitored by a LAM circuit 136 or RAM circuit 502, the PEL circuit 126 can be configured to communicate an associated power limiting management response 140(1)-140(Q) to the RAM circuit 502. The RAM circuit 502 in this example includes a command processor 626 that is configured to receive a power limiting management response 140(1)-140(Q) to process the power limiting management response 140(1)-140(Q) to identify the LAM circuit 136 to communicate with to effectuate the power throttling requested in the received power limiting management response 140(1)-140(Q). In this example, the RAM circuit 502 includes a limiting command engine circuit 628 that is configured to generate a local power limiting management response 630 directed to the LAM circuit 136 that can effectuate the power throttling requested in the received power limiting management response 140(1)-140(Q). Note that if the local power limiting management response 630 is to throttle power consumption of multiple processing devices 110 monitored by multiple LAM circuits 136 associated with the RAM circuit 502, the limiting command engine circuit 628 can address the local power limiting management response 630 to multiple LAM circuits 136. Also note that in this example, if the RAM circuit 502 includes the LAM circuit 136R, and the RAM circuit 502 is monitoring a processing device 110 that is the target device 200 to be throttled, the limiting command engine circuit 628 generates the local power limiting management response 630 directed to the LAM circuit 136R.

With continuing reference to FIG. 6, in response to a LAM circuit 136 receiving a local power limiting management response 630, a power limiting management decode and sequencer circuit 632 is configured to process the received local power limiting management response 630. The power limiting management decode and sequencer circuit 632 is configured to determine the power throttling response to be effectuated to a monitored processing device 110 based on the local power limiting management response 630. In this regard, the power limiting management decode and sequencer circuit 632 is configured to generate local throttle signals 634 to cause the power consumption in the processing device 110 to be throttled. For example, power limiting management decode and sequencer circuit 632 can be configured to generate a sequence of local throttle signals 634 to continually throttle up or down the power consumption of the monitored processing device 110 associated with its LAM circuit 136.

Note that in the sequence of operations and communications described above with regard to the LAM circuits 136 communicating activity power events 606 to the RAM circuits 502, and the RAM circuits 502 communicating aggregated activity power events 138 to the PEL circuit 126, communication delays are incurred. There is a delay between generating the activity samples 600 of sampling of power consumptions in a processing device 110 in a LAM circuit 136 and the reporting and receipt of an associated aggregated activity power event 138 in the PEL circuit 126. This delay can be particularly large for an IC chip 104 that has a larger area, such as one that includes a number of PU clusters 108(0)-108(N) and other processing devices 110 as in the processor-based system 100. By the time the PEL circuit 126 receives the associated aggregated activity power event 138 and processes such to a generation of an associated power limiting management response 140(1)-140(Q), the power consumed by monitored processing device 110 may have already exceeded desired power limits in an undesired manner and/or for an undesired amount of time, possibly causing the power consumption in the IC chip 104 to exceed designed power limits. Further, instantaneous current demand by a monitored processing device 110 can cause di/dt events or voltage droop events that can cause performance issues and/or failures that may not be able to be timely addressed by the PEL circuit 126.

To mitigate the delay in the PEL circuit 126 receiving an aggregated activity power events 138 associated with monitored processing devices 110 in the processor-based system 100 that may affect throttling of power consumption within the processor-based system 100, the LAM circuits 136, 136R can also be configured to directly throttle performance of its monitored processing device 110 to throttle its current demand and thus throttle its power consumption. This gives the PEL circuit 126 more reaction time to receive and process aggregated activity power events 138 to determine how power consumption in the processor-based system 100 should be throttled to achieve a desired overall performance while also maintaining power consumption within desired limits. In this manner, then LAM circuits 136, 136R may be able to more timely mitigate a power issue by locally throttling power consumption of its specific monitored processing device 110 on a device granularity (without having to throttle performance in other processing devices 110). The LAM circuits 136, 136R can be configured to continuously monitor and throttle power consumption locally in its monitored processing device 110 co-existent with the PEL circuit 126 generating power limiting management responses 140 to limit power consumption by target devices 200 in the processor-based system 100.

In this regard, as shown in FIG. 6, the LAM circuit 136 in this example includes a di/dt circuit 636 to track the rate of change of power consumption by the processing device 110 for local power consumption throttling of its monitored processing device 110. In this regard, the di/dt circuit 636 is configured to receive the estimated current demand 604 for the activity of the processing device 110 sampled by the LAM circuit 136 from the accumulate circuit 602 in each local time window. For each incoming estimated current demand 604 received (e.g., received for a given local time window), the di/dt circuit 636 is configured generate a next summed current demand 638 of such incoming estimated current demand 604 in the next local time window from the accumulate circuit 602 with one or more previous received estimated current demands 604 received for a previous estimated current demand 604 in a previous local time window. In this manner, the next summed current demand 638 is a running sum of the estimated current demands 604 for the processing device 110 over consecutive local time windows. The di/dt circuit 636 provides the next summed current demand 638 to an application processor 640 that provides a determined next current flow rate 642 based on the next summed current demand 638 to a throttle FSM circuit 644. The throttle FSM circuit 644 is configured to determine on an ongoing basis whether the next current flow rate 642 of the assigned processing device 110 exceeds a threshold current flow rate or change in current flow rate configured for the monitored processing device 110 in the LAM circuit 136. In response to determining that the next current flow rate 642 of the assigned processing device 110 exceeding the threshold current flow rate, the throttle FSM circuit 644 is configured to generate the local throttle signals 634 to throttle the power consumption of the monitored processing device 110.

In this manner, the LAM circuit 136 is configured to continually monitor the ongoing current flow rate of its monitored processing device 110 to be able to locally throttle the power consumption of the monitored processing device 110. In this manner, the LAM circuit 136 is configured to more quickly respond to power consumption issues caused by the current demand of the monitored processing device 110, such as di/dt events and voltage droops, before the PEL circuit 126 may be able to respond.

As an example, if the monitored processing device 110 by the LAM circuit 136 is a network node 500 of the internal communication network 114, the local throttle signals 634 generated by the LAM circuit 136 may be a throughput throttle to selectively enable and disable communication flow in the network node 500 to throttle its throughput thus throttling its power consumption. As another example, if the monitored processing device 110 by the LAM circuit 136 is a PU cluster 108(0)-108(N) or other processing device 110, the local throttle signals 634 generated by the LAM circuit 136 may be a performance throttle to selectively throttle performance or workload of the monitored PU cluster 108(0)-108(N) or other processing device 110 to throttle its performance thus throttling its power consumption.

Note that sampling of processing activity discussed herein may be accomplished by determining or sampling a quantity that is associated with an instantaneous activity of the monitored processing device 110. For example, the workload performed by a monitored processing device 100 may be determined or discoverable as an indirect method to determine instantaneous activity that can be correlated to an estimated current or power consumption. As another example, activity of a monitored processing device 110 may be determined by sensing a temperature at a temperature sensor associated with the processing device 110. As another example, a voltage droop may be sensed at the processing device 110 to determine an activity sample. Also, other quantities may be used to sample activity. As an example, an incoming interrupt at the processing device, a status register, a state of an interrupt queue, or a signal indicating whether the processing device busy or idle, may be used for sampling of processing activity. In some examples, input source circuits such as LAM circuit 136 may determine input telemetry values based on samples of processing activity. In this respect, sampling of processing activity may be suitable for generating measurements for determining input telemetry values, such as input power telemetry values based on a measurement of one of capacitance, electric charge, energy, and current.

Note that the components to perform local throttling by the LAM circuit 136 can also be provided in the LAM circuit 136R in the RAM circuit 502 so that the LAM circuit 136R is also configured to locally throttle a monitored processing device 110.

Figure 7:
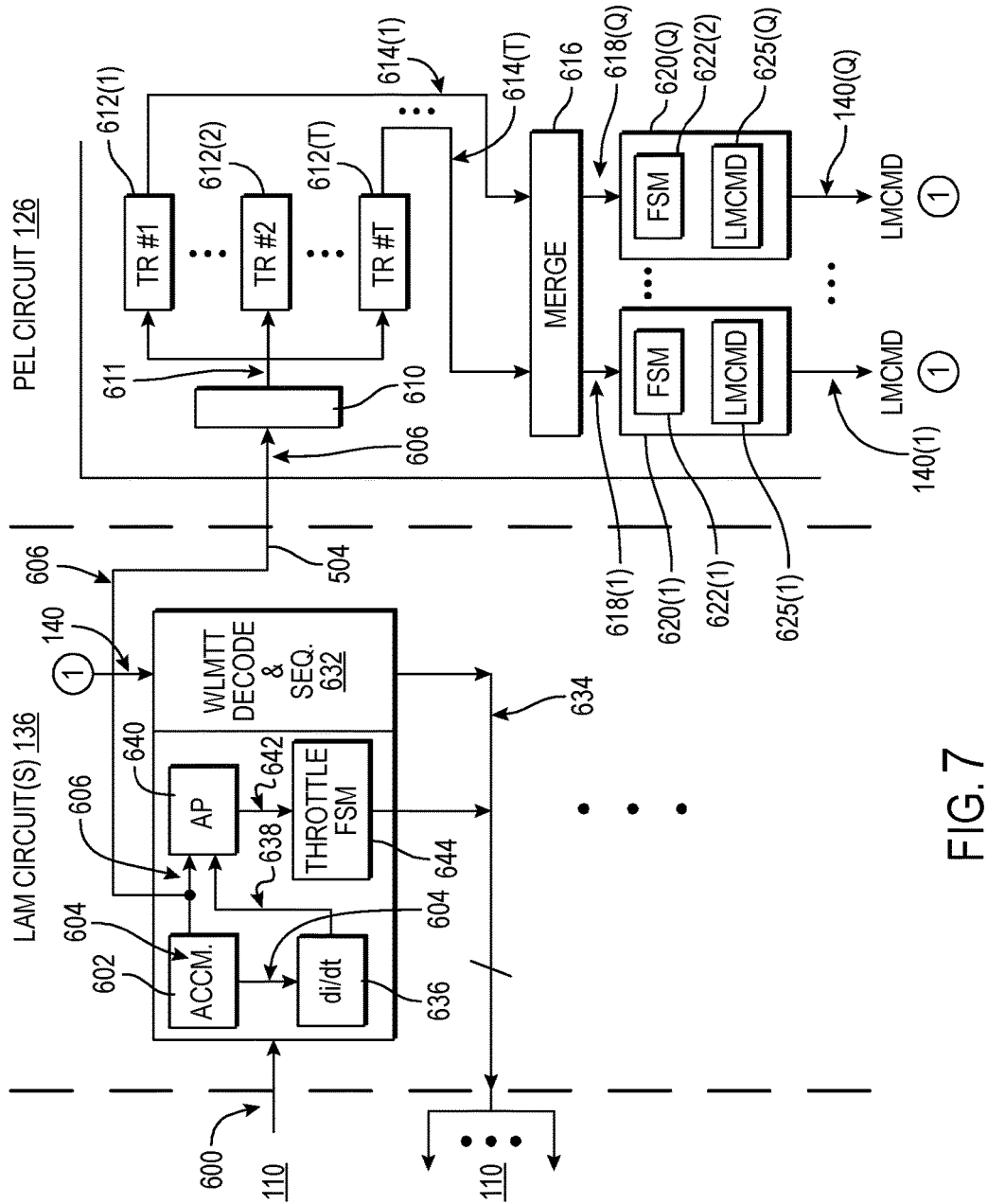
FIG. 7 is a schematic diagram of another exemplary two (2) level hierarchical power management system that can be provided in the processor-based system in the IC chip in FIG. 1, wherein two (2) level hierarchical power management system includes: a first local level of LAM circuits configured to perform local device monitoring and power consumption throttling, and a second, centralized level of a PEL circuit configured to collect aggregated activity power events regarding power consumption of the monitored processing devices and throttle power in the IC chip in response.

Note that the hierarchical power management system 124 provided in the IC chip 104 for the processor-based system 100 in FIG. 1 is not limited to the three (3) level hierarchical power management system 624 in FIG. 6. For example, FIG. 7 is a schematic diagram of an alternative two (2) level hierarchical power management system 724 that can be provided as the hierarchical power management system 124 in the processor-based system 100 in the IC chip 104 in FIGS. 1-3 and 5. The hierarchical power management system 724 in FIG. 7 is similar to the hierarchical power management system 624 in FIG. 6, except that the intermediate RAM circuits 502 are not included in the hierarchical power management system 724 in FIG. 7. The LAM circuits 136 are configured to provide activity power events 606 directly to the PEL circuit 126 to be processed. Common elements between the hierarchical power management system 724 in FIG. 7 and the hierarchical power management system 124 in FIGS. 1-3 and 5 are shown with common element numbers and are not re-described.

Also, as discussed herein or the claims, it is stated that the PEL circuit 126 receives activity power events 606 from a LAM circuit 136, this receipt of activity power events 606 can be directly from the LAM circuit 136 to the PEL circuit 126 or indirectly from one or more intermediate circuits, including the RAM circuits 502. For example, as discussed above, the activity power events 606 generated by the LAM circuits 136 can be indirectly reported to the PEL circuit 126 the as part of being included in aggregated activity power events 138 generated and reported by a RAM circuit 502 to the PEL circuit 126 as part of received activity power events 606.

Figure 8:
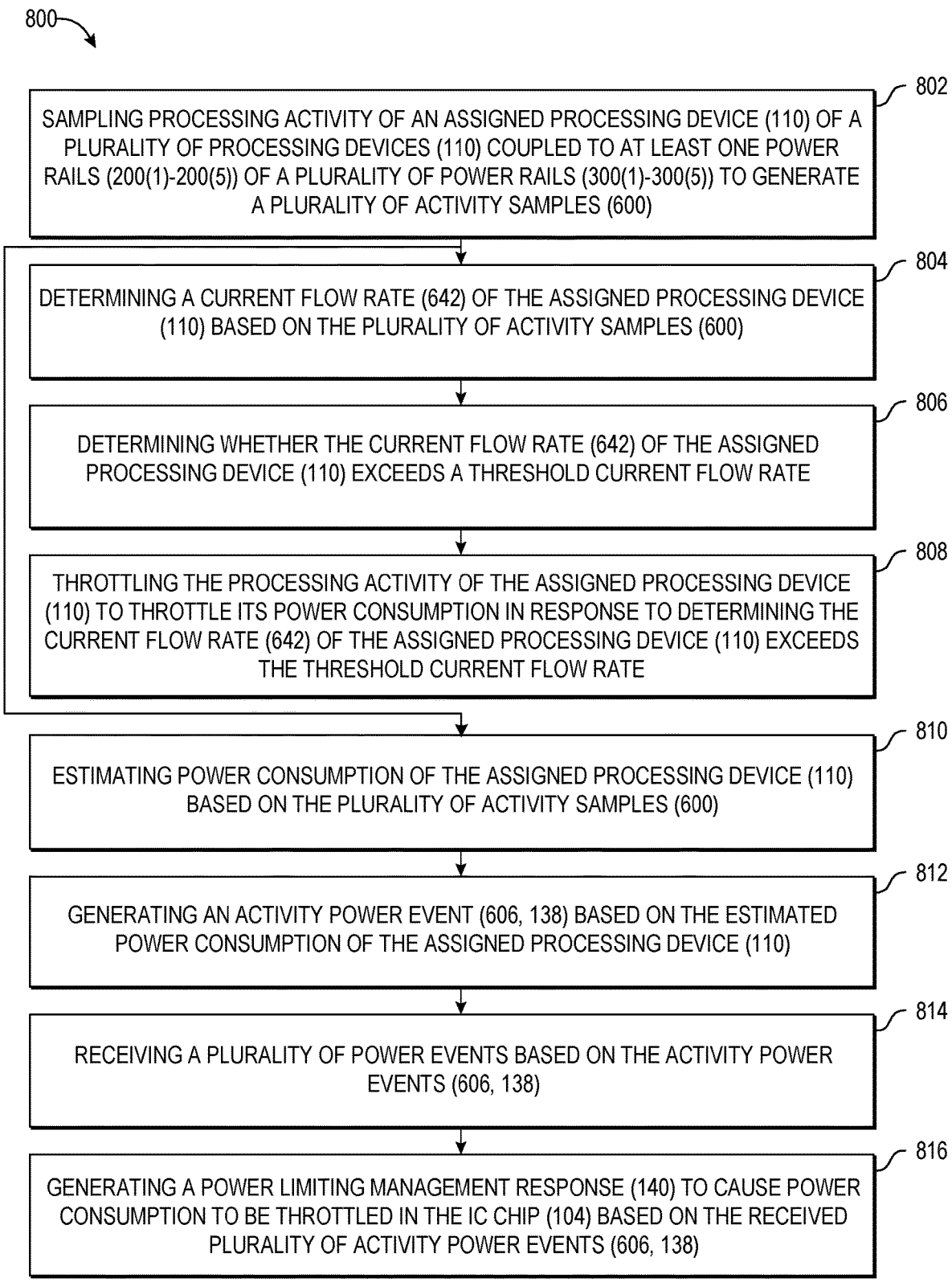
FIG. 8 is a flowchart illustrating an exemplary process of the hierarchical power management system of the processor-based system in FIG. 6 locally monitoring and throttling power consumption of monitored processing devices and hierarchically reporting activity power events related to the monitored power consumption to a PEL circuit configured to throttle power consumption in the processor-based system in response to the received power events.

FIG. 8 is a flowchart illustrating an exemplary process 800 of the LAM circuits 136 and/or the RAM circuits 502 in the hierarchical power management systems 124, 624, 724 in FIGS. 1-3 and 5-7 locally monitoring and throttling power consumption of monitored processing devices 110. The process 800 also includes the hierarchically reporting activity power events 606, 138 related to the monitored power consumption by LAM circuits 136 and/or the RAM circuits 502 to throttle power consumption in the processor-based system 100 in response to the received activity power events 606, 138. The process 800 in FIG. 8 is discussed with regard to the hierarchical power management systems 624, 724 as examples.

In this regard, as shown in FIG. 8, a first step of the process 800 can be sampling processing activity of an assigned processing device 110 of a plurality of processing devices 110 coupled to at least one power rails 300(1)-300(5) of a plurality of power rails 300(1)-300(5) to generate a plurality of activity samples 600 (block 802 in FIG. 8). A next step in the process 800 can be determining a current flow rate 642 of the assigned processing device 110 based on the plurality of activity samples 600 (block 804 in FIG. 8). A next step in the process 800 can be determining whether the current flow rate 642 of the assigned processing device 110 exceeds a defined threshold current flow rate (block 806 in FIG. 8). A next step in the process 800 can be throttling the processing activity of the assigned processing device 110 to throttle its power consumption in response to determining the current flow rate 642 of the assigned processing device 110 exceeds the threshold current flow rate (block 808 in FIG. 8). Also, in addition to and/or in parallel to steps 804-808, another step in the process 800 can be estimating power consumption of the assigned processing device 110 based on the plurality of activity samples 600 (block 810 in FIG. 8). A next step in the process 800 can be generating an activity power event 606, 138 based on the estimated power consumption of the assigned processing device 110 (block 812 in FIG. 8). A next step in the process 800 can be receiving a plurality of power events based on the activity power events 606, 138 (block 814 in FIG. 8). A next step in the process 800 can be generating a power limiting management response 140 to cause power consumption to be throttled in the IC chip 104 based on the received plurality of activity power events 606, 138 (block 816 in FIG. 8).

Figure 9A:
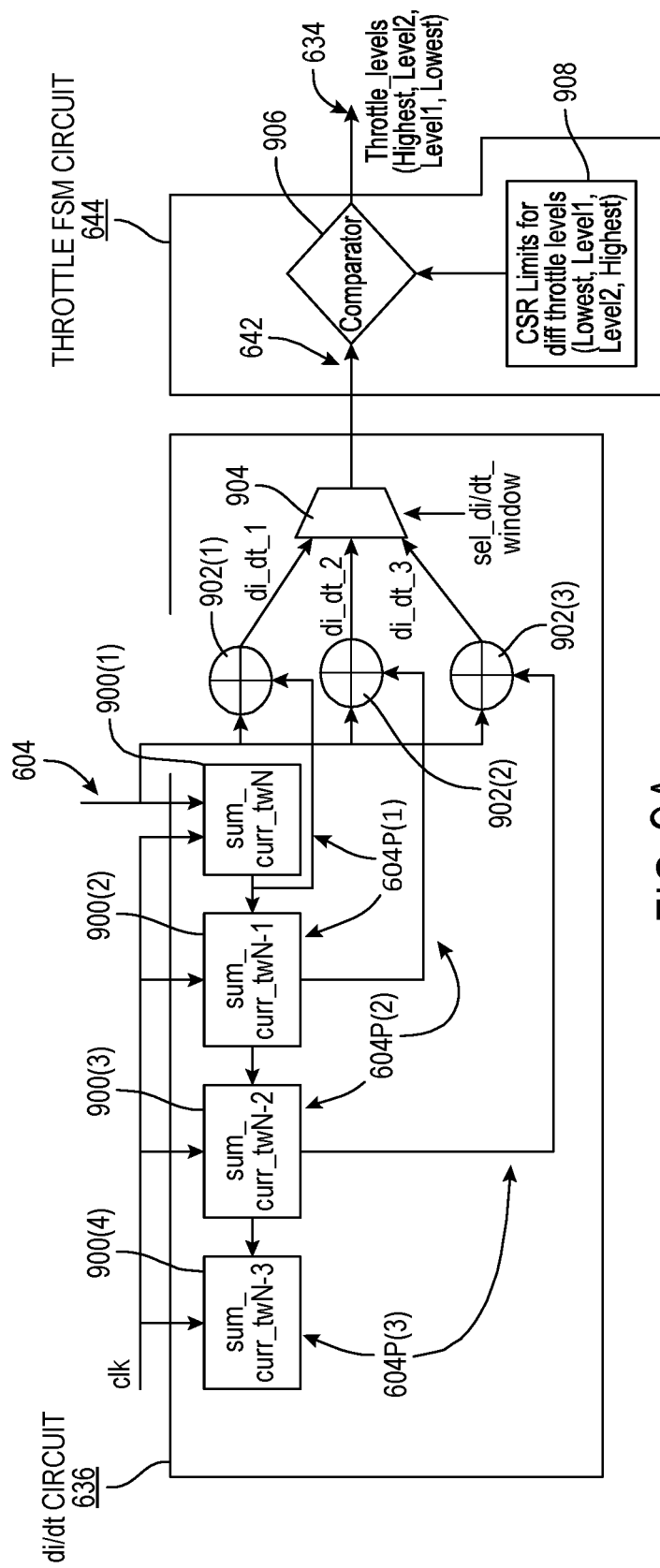
FIG. 9A is a schematic diagram illustrating an exemplary di/dt circuit that can be provided in a LAM circuit in the hierarchical power management system in FIG. 6, wherein the di/dt circuit is configured to collect activity samples of a device monitored by the LAM circuit and correlate the activity samples to estimate current and generate estimated current samples in a designated time window which can then be used to determine the slope of a rate of change in current/current flow rate (di/dt) consumed by the monitored processing device to determine whether the power consumption of the monitored processing device should be throttled by the LAM circuit.

FIG. 9A is a schematic diagram illustrating exemplary detail of the di/dt circuit 636 and throttle FSM circuit 644 in the LAM circuit 136 shown in FIG. 6 to collect received estimated current demands 604 for processing activity of a monitored processing device 110 over local time windows and determine if a current flow rate and/or change in current flow rate of the monitored processing device 110 exceeds a threshold current flow rate. This information is used by the LAM circuit 136 to determine if its monitored processing device 110 should be locally throttled by its assigned LAM circuit 136 as previously discussed in FIG. 6.

In this regard, as shown in FIG. 9A, the di/dt circuit 636 is configured to receive next estimated current demands 604 that are generated for each local time window of the LAM circuit 136 as discussed in FIG. 6. The di/dt circuit 636 includes a plurality of latch circuits 900(1)-900(4) that are clocked circuits (e.g., flip-flops) and are configured to store the incoming next estimated current demands 604 and previously received estimated current demands 604P(1)-604P(3). Latch circuit 900(1) stores the next incoming estimated current demand 604. The next incoming estimated current demand 604 stored in the latch circuit 900(1) and the previous estimated current demands 604P(1)-604P(3) stored in the latch circuits 900(1)-900(3) are then shifted to the next respective latch circuit 900(2)-900(4) for each newly received incoming estimated current demand 604 representing a local time window. For each incoming estimated current demand 604 received representing a local time window, the incoming estimated current demand 604 and previous estimated current demands 604P(1)-640P(3) are provided to respective summing circuits 902(1)-902(4). The summing circuits 902(1)-902(3) subtract the incoming estimated current demand 604 with a respective previous estimated current demand 604P(1)-604P(3) to generate respective current flow rates over local time windows (i.e., change in current flow rates) di_dt_1, di_dt_2, di_dt_3, as discussed below, of the incoming estimated current demand 604 and the respective estimated current demands 604P(1)-604P(3). Thus, the determined change in current flow rates di_dt_1, di_dt_2, di_dt_3 represent a rate in change in current flow rate or current demand and thus rate of change in power consumption of the monitored processing device 110 between the local time windows when the incoming estimated current demand 604 was received and a previous local time window of the respective previous estimated current demands 604P(1)-604P(3). di_dt_1 is the change in current or current flow rate between respective estimated current demand 604 and 604P(1). di_dt_2 is the change in current or current flow rate between respective estimated current demand 604 and 604P(2). di_dt3 is the change in current or current flow rate between respective estimated current demand 604 and 604P(3).

Figure 9B:
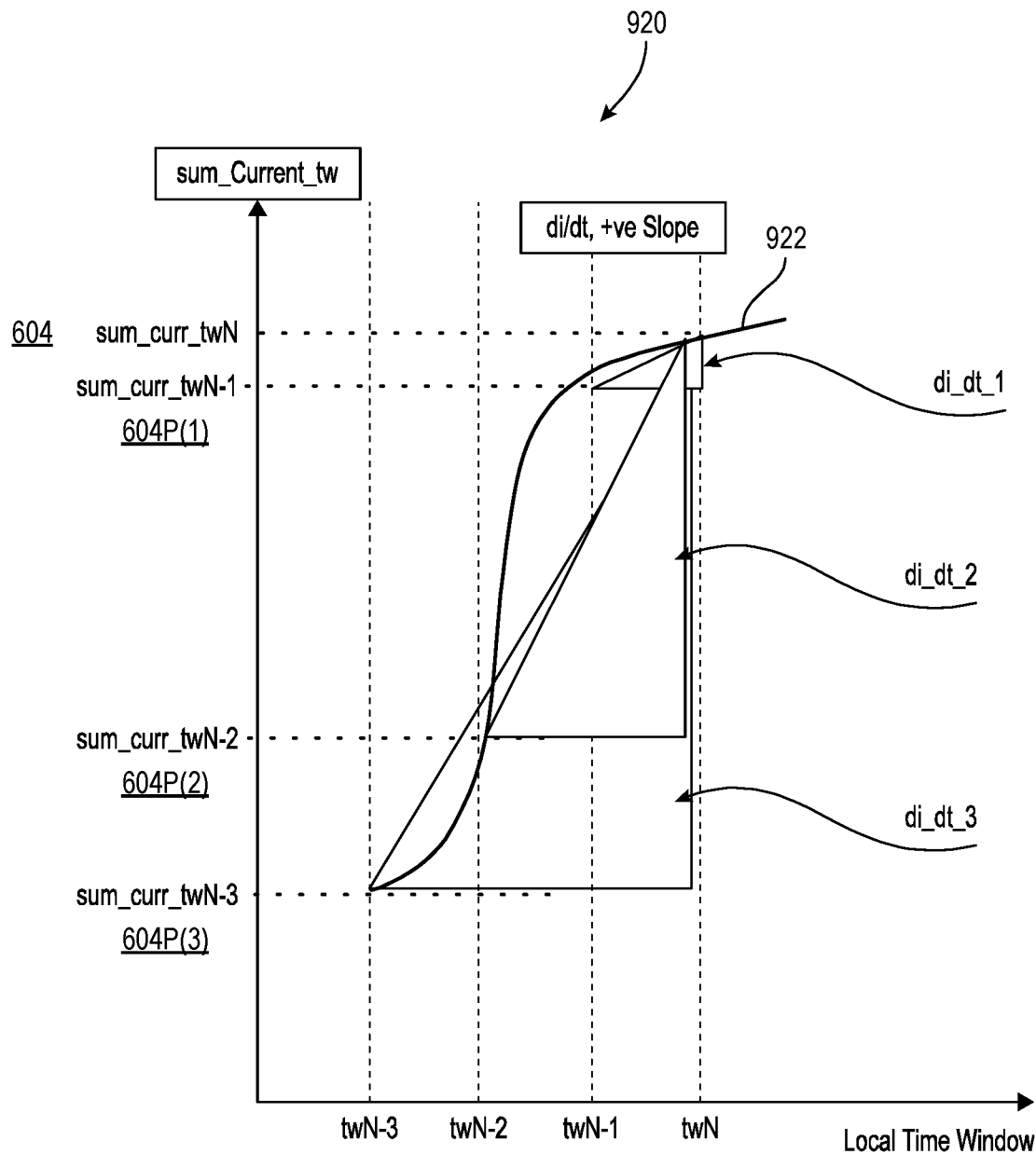
FIG. 9B is a graph illustrating exemplary estimated current samples collected by the di/dt circuit in FIG. 9A plotted as a function of time to determine the rate of change in current flow rate (di/dt) consumed by the monitored processing device.

With continuing reference to FIG. 9A, these change in current flow rates di_dt_1, di_dt_2, di_dt_3 are then provided to a multiplexing circuit 904 that can selectively provide one of the change in current flow rates di_dt_1, di_dt_2, di_dt_3 as the next current flow rate 642 to a comparator circuit 906 in the throttle FSM circuit 644, discussed below. The selected change in current flow rate di_dt_1, di_dt_2, di_dt_3 provided as the next current flow rate 642 to the multiplexing circuit 904 is based on a local time window selection signal sel_di_dt_window to select the local time windows to be compared to each current flow rate. This allows the flexibility of the di/dt circuit 636 to be programmed to select the local time windows of estimated current demands 604P(1), 604P(2) to be compared to the incoming estimated current demand 604. For example, FIG. 9B is a graph 920 illustrating exemplary incoming and estimated current demands 604, 604P(1)-604P(3) collected by the di/dt circuit 636 in FIG. 9A plotted as a function of local time window to show how the incoming and estimated current demands 604, 604P(1)-604P(3) can be subtracted to generate respective change in current flow rates di_dt_1, di_dt_2, di_dt_3 between the incoming estimated current demand 604 and the estimated current demands 604P(1)-604P(3) over their respective local time windows twN, twN-1, twN-2, twN-3. The duration of the local time windows is known. Thus, the change in current flow rates di_dt_1, di_dt_2, di_dt_3 represent a change in current demand between the incoming estimated current demand 604 in a current local time window and a respective previous estimated current demand 604P(1)-604P(3) over the difference in their local time windows. The current flow rate curve 922 represents the current flow rate of a processing device 110 over a period of local time windows twN-3, twN-2, twN-1, and twN. As shown in FIG. 9B, the slope of the current flow rate curve 922 changes at each of the local time windows twN-3, twN-2, twN-1, and twN based on the change in current demand or change in current flow rate demanded of the processing device 110 between local time windows twN-3, twN-2, twN-1, and twN. FIG. 9B shows the basis on which the di/dt circuit 636 in FIG. 9A can generate the change in current flow rates di_dt_1, di_dt_2, di_dt_3 representing a change in current demand between the incoming estimated current demand 604 in a current local time window and a respective previous estimated current demand 604P(1)-604P(3) over the difference in their local time windows twN-3, twN-2, twN-1, and twN. This can be used to provide the current flow rate 642 of the processing device 110 to use to determine local power consumption throttling.

The selected next current flow rate 642 is provided by the di/dt circuit 636 to the comparator circuit 906 in the throttle FSM circuit 644. The throttle FSM circuit 644 is configured to generate the local throttle signals 634 to throttle power consumption of the monitored processing device 110 based on whether the selected next current flow rate 642 (from selection of change in current flow rate di_dt_1, di_dt_2, di_dt_3) exceeds a threshold current flow rate (which can include a threshold change in current flow rate) for the monitored processing device 110. The threshold current flow rate for the monitored processing device 110 can be obtained from a current flow rate register 908. The current flow rate register 908 can be programmed with a threshold current flow rate for the monitored processing device 110. For example, the current flow rate register 908 can be programmed with different threshold current flow rates (e.g., lowest, level 1, level 2, highest) so that the comparator circuit 906 can generate local throttle signals 634 for different levels of power consumption throttling based on the comparison of selected next current flow rate 642 (from selection of change in current flow rate di_dt_1, di_dt_2, di_dt_3) with the selected threshold current flow rate obtained from the current flow rate register 908.

Note that when current flow rate is discussed herein, such also means current flow and represents current (I) over a period of time (t) (I/t) or a change in the current flow rate (di/dt). A determined change in the current flow rate (di/dt) is determined from a determined current flow rate (t/T).

Figure 10:
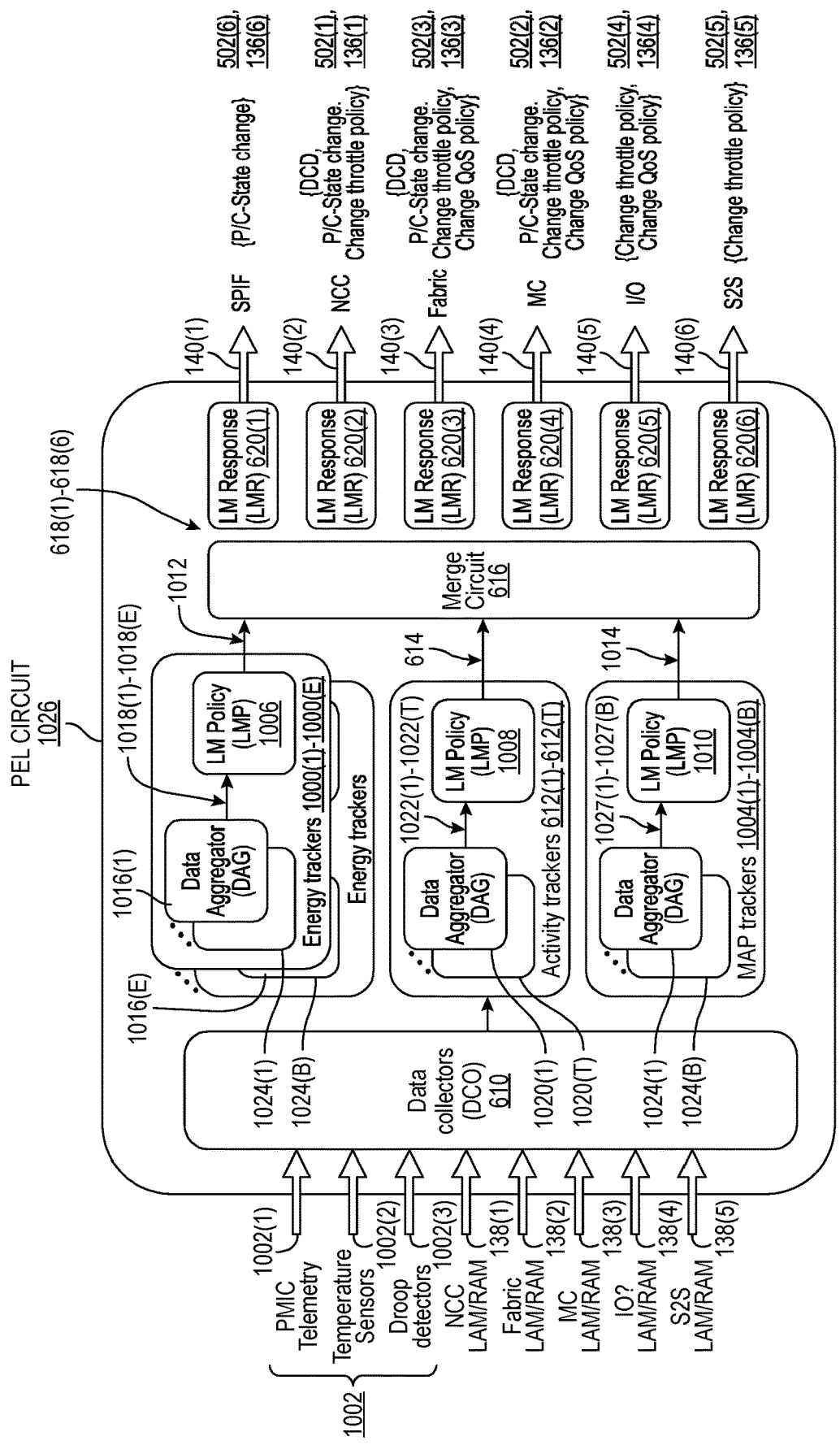
FIG. 10 is a logic diagram of an exemplary PEL circuit that can be provided in the hierarchical power management system of the processor-based system, and that illustrates exemplary components for receiving power events, decoding the received power events in tracking circuits, and merging the tracked power events to generate a power limiting management responses to throttle power consumption in the processor-based system in response to the received power events.

The components of the hierarchical power management systems 124, 624, 724 in FIGS. 1-3 and 5-7 described above can be provided in different implementations. For example, FIG. 10 is a logic diagram of another exemplary PEL circuit 1026 that can be PEL circuit 126 provided in the hierarchical power management system 124, 624, 724 in FIGS. 1-3 and 5-7. Common elements between the PEL circuit 1026 in FIG. 10 and the PEL circuit 126 in the hierarchical power management system 124, 624, 724 in FIGS. 1-3 and 5-7 are shown with common element numbers.

In this regard, as shown in FIG. 10, the PEL circuit 1026 is configured to receive the aggregated activity power events 138(1)-138(5) from the one or more RAM circuits 502. In this example, the PEL circuit 126 includes the decode circuit 610 that is configured to decode the received aggregated activity power events 138(1)-138(5) into the corresponding activity tracker circuit 612(1)-612(T) as previously described. The PEL circuit 1026 in this example also includes energy tracker circuits 1000(1)-1000(E) that are associated with energy power events 1002, such as PMIC telemetry power events 1002(1), temperature events 1002(2), and voltage droop detection events 1002(3) (all of which are examples of non-activity power events), that can also affect how the PEL circuit 126 decides to throttle power. The PEL circuit 1026 in this example also includes maximum average power (MAP) tracker circuits 1004(1)-1004(B) that are circuit trackers that track the total power consumed in the SoC 102 according to a defined maximum power consumption limit. Similar to the activity tracker circuits 612(1)-612(T), the energy tracker circuits 1000(1)-1000(E) and the MAP tracker circuits 1004(1)-1004(B) are configured to respective energy power events 1002(1)-1002(3) and/or aggregated activity power events 138(1)-138(5) to determine whether a factor exists that is dependent on power consumption that exceeds a defined power (e.g., current) threshold/limit.

The energy tracker circuits 1000(1)-1000(E) each include respective data aggregator circuits 1016(1)-1016(E) that are configured to aggregate the received energy power events 1002 into respective aggregated energy power events 1018(1)-1018(E). The activity tracker circuits 1000(1)-1000(E) also each include respective data aggregator circuits 1020(1)-1020(T) that are configured to aggregate received energy power events into respective aggregated energy power events 1022(1)-1022(T). The MAP tracker circuits 1004(1)-1004(B) also each include respective data aggregator circuits 1024(1)-1024(B) that are configured to aggregate received energy power events into respective aggregated MAP power events 1027(1)-1027(B). The energy tracker circuits 1000(1)-1000(E), the activity tracker circuits 612(1)-612(T), and the MAP tracker circuits 1004(1)-1004(B) in this example each include a respective energy power limit management policy circuits 1006, activity power limit management policy circuits 1008, and MAP power limit management policy circuits 1010 that are configured to generate respective energy power throttle recommendations 1012, activity power throttle recommendations 614, and MAP power throttle recommendations 1014. These generated respective energy power throttle recommendations 1012, activity power throttle recommendations 614, and MAP power throttle recommendations 1014 are based on the respective received aggregated energy power events 1018(1)-1018(E), aggregated activity power events, 1022(1)-1022(T), aggregated MAP power events 1027(1)-1027(B) for the PEL circuit 126 to process to determine how to throttle power consumption in the IC chip 104.

With continuing reference to FIG. 10, the energy tracker circuits 1000(1)-1000(E), the activity tracker circuits 612(1)-612(T), and the MAP tracker circuits 1004(1)-1004(B) are configured to compare a power consumption indicated by the respective aggregated energy power events 1018(1)-1018(E), aggregated activity power events 1022(1)-1022(T), and aggregated MAP power events 1027(1)-1027(B), to the respective energy power limit management policy circuits 1006, activity power limit management policy circuits 1008, and MAP power limit management policy circuits 1010 energy tracker circuits 1000(1)-1000(E), the activity tracker circuits 612(1)-612(T), and the MAP tracker circuits 1004(1)-1004(B). The energy tracker circuits 1000(1)-1000(E), the activity tracker circuits 612(1)-612(T), and the MAP tracker circuits 1004(1)-1004(B) are then configured to generate the respective energy power throttle recommendations 1012, activity power throttle recommendations 614, and MAP power throttle recommendations 1014 based on the comparison of the power consumptions indicated by the respective aggregated power events 1018(1)-1018(E), 1022(1)-1022(T), 1027(1)-1027(B) to the respective power limit management policy circuits 1006, 1008, 1010. For example, the energy power limiting management policy circuits 1006, the activity power limit management policy circuits 1008, and the MAP limiting management policy circuits 1010 may each have respective a threshold power consumption that is compared to the respective aggregated power events 1018(1)-1018(E), 1022(1)-1022(T), 1027(1)-1027(B) to determine the respective power throttle recommendations 1012, 614, 1014.

With continuing reference to FIG. 10, the PEL circuit 1026 also includes the merge circuit 616 that merges the energy power throttle recommendations 1012, generate respective activity power throttle recommendations 614, and MAP power throttle recommendations 1014 into merged power throttle recommendations 618(1)-618(6). The merged power throttle recommendations 618(1)-618(6) are provided to respective assigned target circuits 620(1)-620(6). Note that each merged power throttle recommendations 618(1)-618(6) can be influenced by power throttle recommendations from each of the energy power throttle recommendations 1012, generate respective activity power throttle recommendations 614, and MAP power throttle recommendations 1014. Each target circuit 620(1)-620(6) is associated with a different target device 200 in the processor-based system 100 in which the PEL circuit 1026 can issue power limiting management responses 140(1)-140(6) to limit the power consumption of such target device 200.

The target devices 200 can include the interface circuits 127(1)-127(Z) that can be throttled by power limiting management responses 140(1) communicated to a RAM circuit 502(6) and/or LAM circuit 136(6) configured to throttle power consumption in such interface circuits 127(1)-127(Z). The target devices 200 can include the PU clusters 108(0)-108(N) that can be throttled by power limiting management responses 140(2) communicated to a RAM circuit 502(1) and/or LAM circuit 136(1) configured to throttle power consumption in such PU clusters 108(0)-108(N). The target devices 200 can include the internal communication network 114 that can be throttled by power limiting management responses 140(3) communicated to a RAM circuit 502(3) and/or LAM circuit 136(3) configured to throttle power consumption in such internal communication network 114. The target devices 200 can include the memory controllers 118(0)-118(M) that can be throttled by power limiting management responses 140(4) communicated to a RAM circuit 502(2) and/or LAM circuit 136(2) configured to throttle power consumption in such memory controllers 118(0)-118(M). The target devices 200 can include the I/O interface circuits 120(0)-120(X) that can be throttled by power limiting management responses 140(5) communicated to a RAM circuit 502(4) and/or LAM circuit 136(4) configured to throttle power consumption in such I/O interface circuits 120(0)-120(X). The target devices 200 can include the S2S interface circuits 122(0)-122(Y) that can be throttled by power limiting management responses 140(6) communicated to a RAM circuit 502(5) and/or LAM circuit 136(5) configured to throttle power consumption in such S2S interface circuits 122(0)-122(Y).

The merge circuit 616 in the PEL circuit 1026 can be programmed to map (e.g., through firmware, electronic fuses, etc.) merged power throttle recommendations 618(1)-618(6) to a particular target device 200, and thus a target circuit 620(1)-620(6), that may not directly correlate to each other. In this manner, the merged power throttle recommendations 618(1)-618(6) related to power issues and power consumption in the IC chip 104 can be mapped in the PEL circuit 1026 to correlate to different target devices 200 for throttling power consumption. The merge circuit 616 can be programmed in a "many-to-many mapping" to correlate to different power limiting management responses within the IC chip 104 in the desired manner for more flexibility in managing power consumption in the IC chip 104 while still achieving the desired performance. In this manner, the power throttling management behavior of the PEL circuit 1026 can be configured and changed even after the IC chip 104 is deployed in an application.

With continuing reference to FIG. 10, the target circuits 620(1)-620(6) are each configured to determine if the power consumption of an associated target device 200 in the processor-based system 100 should be throttled based on the merged power throttle recommendations 618(1)-618(6) provided to the target circuits 620(1)-620(6). The target circuits 620(1)-620(6) are each configured to analyze the respective received merged power throttle recommendation 618(1)-618(6) to determine if power consumption of an associated target device 200 should be throttled. If a target circuit 620(1)-620(Q) determines that power consumption of an associated target device 200 in the processor-based system 100 should be throttled, the target circuit 620(1)-620(Q) causes an associated power limiting management response 140(1)-140(6) to be generated to be communicated to a respective RAM circuit 502(1)-502(6) and/or LAM circuit 136(1)-136(6) cause the power consumption of a target device 200 associated with the power limiting management response 140(1)-140(Q) to limit power consumption.

As discussed above with regard to FIG. 2, the LAM circuits 136 may be configured to locally monitor activity of the processing devices 110 to estimate and throttle power consumption and to report activity power events 138 regarding estimated power consumption to the PEL circuit 126. Each of the LAM circuits 136 may compute power telemetry values by calculating a weighted sum of respective activity power events 138 over an aggregation time window. The weighted sums from the LAM circuits 136 in some aspects may be aggregated by RAM circuits such as the RAM circuits 502, and/or may be routed to PEL circuits such as the PEL circuit 126, where they may be used to generate a power limiting management response such as the power limiting management response 140. The LAM circuits 136 and the RAM circuits 502 thus may be collectively referred to herein as "input source circuits."

The power telemetry values reported to the PEL circuit 126 by the input source circuits may vary from one another based on factors such as dynamic activity, type of exercised logic cone, and realized functionality. Some telemetry values, such as power telemetry values representing power measurements, may be reported to the PEL circuit 126 as unitless quantities, while some may be reported as one of a number of various units. Since different input source circuits providing data to the PEL 126 may report using varied units, precisions, and dynamic ranges, the processor-based system 100 (e.g., PEL circuit 126) must convert the data into a common range and unit before processing the data (e.g., by aggregating data from the input source circuits for estimation for longer time windows). The processor-based system 100 must also convert unitless quantities into, e.g., units such as joules (for energy) or coulombs (for electric charge), as appropriate.

Figure 11:
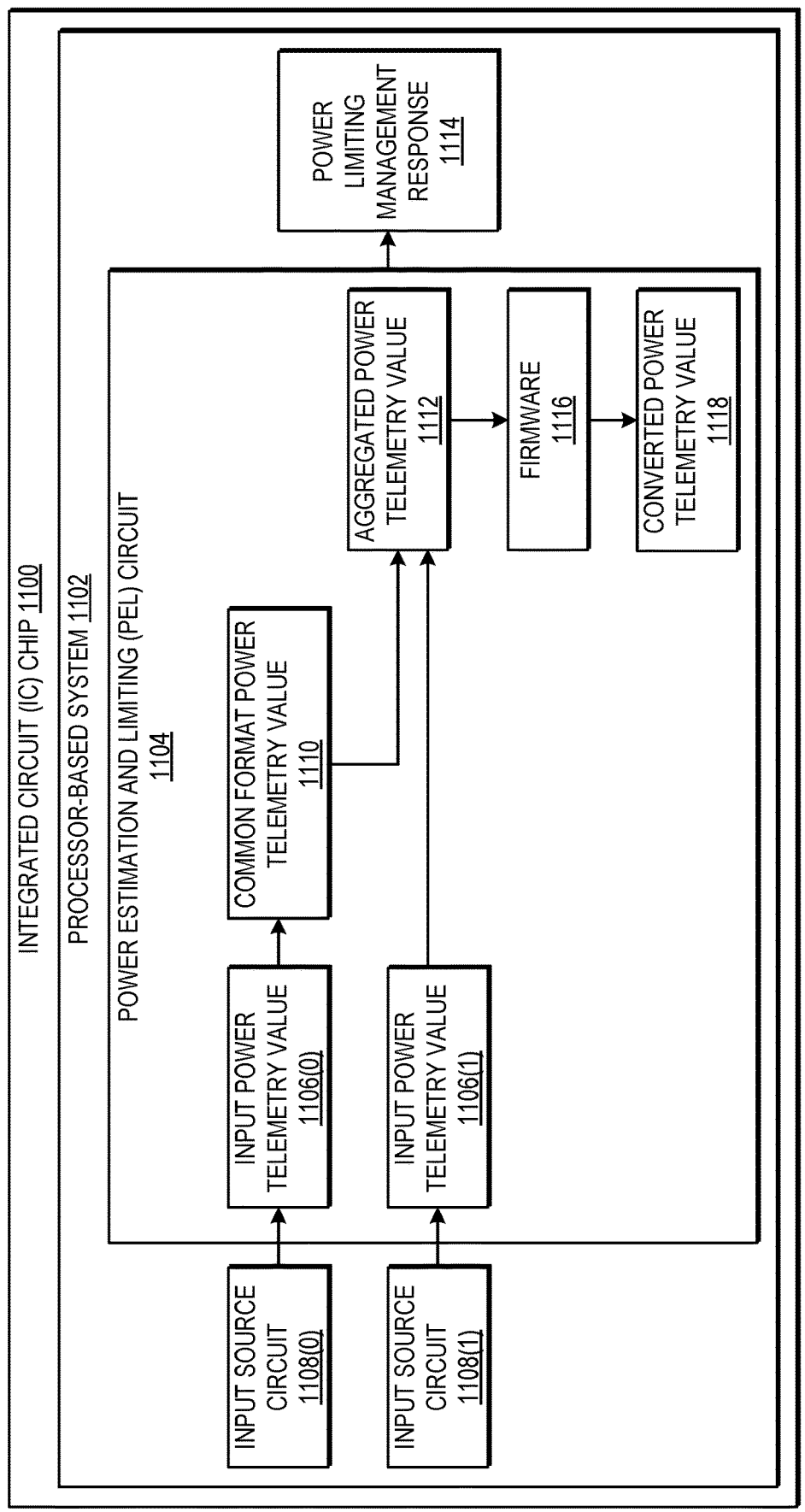
FIG. 11 is a block diagram illustrating an exemplary PEL circuit that is configured to convert input power telemetry values into common data format values where a least significant bit represents a unit value greater that one (1), according to some aspects.

In this regard, FIG. 11 illustrates an exemplary aspect of an IC chip 1100 providing a processor-based system 1102 that comprises a PEL circuit 1104 configured to convert power telemetry values into common data formats for power estimation and throttling. In particular, aspects according to FIG. 11 convert and store power telemetry values without the need for multiplier circuits or divider circuits, thus reducing the complexity and improving the performance of the PEL circuit 1104. In FIG. 11, the PEL circuit 1104 corresponds in functionality to, e.g., the PEL circuit 126 discussed in greater detail above. The PEL circuit 1104 of FIG. 11 is configured to receive input power telemetry values 1106(0)-1106(1) from respective input source circuits 1108(0)-1108(1). The input source circuits 1108(0)-1108(1) each may comprise, e.g., a LAM circuit such as one of the LAM circuits 136, a RAM circuit such as one of the RAM circuits 502, a processing unit, or a PMIC such as the PMIC 125. Each of input power telemetry value may be received by the PEL circuit 1104 as part of an activity power event such as one of the activity power events 138, and may represent a measurement of one of capacitance, electric charge, energy, and current, as non-limiting examples.

It is to be understood that, while FIG. 11 illustrates the IC chip 1100 as comprising the PEL circuit 1104, aspects of the present disclosure are not limited to IC chips and processor-based systems that comprise PEL circuits. Furthermore, while FIG. 11 illustrates input telemetry values as input power telemetry values and the common format telemetry value as a common format power telemetry value, aspects of the present disclosure are not limited to telemetry values representing power measurements. Rather, the methods, apparatuses, and non-transitory computer-readable media of the present disclosure may be useful in any processor-based systems where values from different sources, having different units, and/or comprising unitless quantities may be stored and converted to a common format.

In order to aggregate input power telemetry values such as the input power telemetry value 1106(1), the PEL circuit 1104 performs conversion operations as necessary to convert the input power telemetry values to a common format with respect to a unit value of a least significant bit of the converted value. In conventional approaches, the unit value of the least significant bit of the converted value is one (1), and converting each of the input power telemetry values 1106(0)-1106(1) may involve multiplying or dividing the input power telemetry values 1106(0)-1106(1) by a power of 10, which would require the use of a multiplier circuit and/or a divider circuit. However, in exemplary operation, the PEL circuit 1104 of FIG. 11 converts the input power telemetry value 1106(0) into a corresponding common format power telemetry value 1110 by performing a bit shift operation on the input power telemetry value 1106(0), effectively multiplying or dividing the input power telemetry value 1106(0) by a power of two (2). The common format power telemetry value 1110 is then treated by the PEL circuit 1104 as though a least significant bit of the common format power telemetry value 1110 represents a unit value greater than one (1), based on a quotient of the power of two (2) and a corresponding power of 10.

For instance, assume for the sake of illustration only that the input power telemetry value 1106(0) is to be converted into a common format comprising milli-units (e.g., millijoules, millicoulombs, or the like). Assume further that the input power telemetry value 1106(0) is provided in micro-units, such that the conversion to the common format in conventional fashion would involve dividing the input power telemetry value 1106(0) by $10^3$ or 1,000. The PEL circuit in this example is configured to convert the input power telemetry value 1106(0) into the common format power telemetry value 1110 by performing a rightward bit shift of the input power telemetry value by 10 bits (i.e., dividing the input power telemetry value 1106(0) by $2^{10}$ or 1,024), with the unit value of a least significant bit of the resulting common format power telemetry value 1110 being 1.024 based on the quotient of $2^{10}/10^3$.

In some examples, the input power telemetry value 1106(0) may be provided in nano-units such that converting the input power telemetry value 1106(0) into the common format would conventionally require dividing the input power telemetry value 1106(0) by $10^6$ or 1,000,000. The PEL circuit in such examples is configured to convert the input power telemetry value 1106(0) into the common format power telemetry value 1110 by performing a rightward bit shift of the input power telemetry value 1106(0) by 20 bits (i.e., dividing the input power telemetry value 1106(0) by $2^{20}$ or 1,048,576), with the unit value of a least significant bit of the resulting common format power telemetry value 1110 being 1.048 based on the quotient of $2^{20}/10^6$.

Some examples may provide that the input power telemetry value 1106(0) is provided in pico-units, such that converting the input power telemetry value 1106(0) into the common format in conventional fashion would require dividing the input power telemetry value 1106(0) by $10^9$ or 1,000,000,000. In such examples, the PEL circuit is configured to convert the input power telemetry value 1106(0) into the common format power telemetry value 1110 by performing a rightward bit shift of the input power telemetry value 1106(0) by 30 bits (i.e., dividing the input power telemetry value by $2^{30}$ or 1,073,741,824), with the unit value of a least significant bit of the resulting common format power telemetry value 1110 being 1.073 based on the quotient of $2^{30}/10^9$.

Some input source circuits, such as the input source circuit 1108(1) of FIG. 11, may be configured to provide an input power telemetry value such as the input power telemetry value 1106(1) that is already in the common format. In such aspects, the PEL circuit 1104 may be configured to first determine whether a conversion of each of the input power telemetry values 1106(0)-1106(1) into a common format power telemetry value such as the common format power telemetry value 1110 is required. If so (e.g., as with the input power telemetry value 1106(0) of FIG. 11), the PEL circuit 1104 converts the input power telemetry value 1106(0) into the common format power telemetry value 1110 responsive to determining that the conversion of the input power telemetry value 1106(0) into the common format power telemetry value 1110 is required. If the PEL circuit 1104 determines that conversion is not necessary, as is the case with the input power telemetry value 1106(1) of FIG. 11, the conversion operations are not performed.

The PEL circuit 1104 then aggregates the common format power telemetry value 1110 (and/or any input power telemetry values that did not require conversion, such as the input power telemetry value 1106(1) of FIG. 11) into an aggregated power telemetry value 1112. This may be performed, for example, by summing the common format power telemetry value 1110 with a current value of the aggregated power telemetry value 1112 having the same unit value for its least significant bit. The PEL circuit 1104 subsequently generates a power limiting management response 1114 to cause power consumption to be throttled in the IC chip 1100 based on the aggregated power telemetry value 1112.

Some aspects may provide that a firmware 1116 of the processor-based system 1102 may subsequently receive the aggregated power telemetry value 1112 from the PEL circuit 1104. It is to be understood that, while FIG. 11 shows the firmware 1116 as an integral element of the PEL circuit 1104, in some aspects the firmware 1116 may be an element of a different component of the processor-based system 1102. Upon receiving the aggregated power telemetry value 1112, the firmware 1116 may perform post-processing to convert the aggregated power telemetry value 1112 to a converted power telemetry value 1118, wherein a unit value represented by a least significant bit of the converted power telemetry value 1118 is one (1). This may be accomplished in some aspects by multiplying the aggregated power telemetry value 1112 by the unit value of the aggregated power telemetry value 1112. For example, if the unit value of a least significant bit of the aggregated power telemetry value 1112 is 1.024, the firmware 1116 may convert the aggregated power telemetry value 1112 to the converted power telemetry value 1118 by multiplying the aggregated power telemetry value 1112 by 1.024. The converted power telemetry value 1118 may then be used by the firmware 1116 for other post-processing operations and/or estimations, configuration of configuration state registers (CSRs), and the like.

Figure 12A:
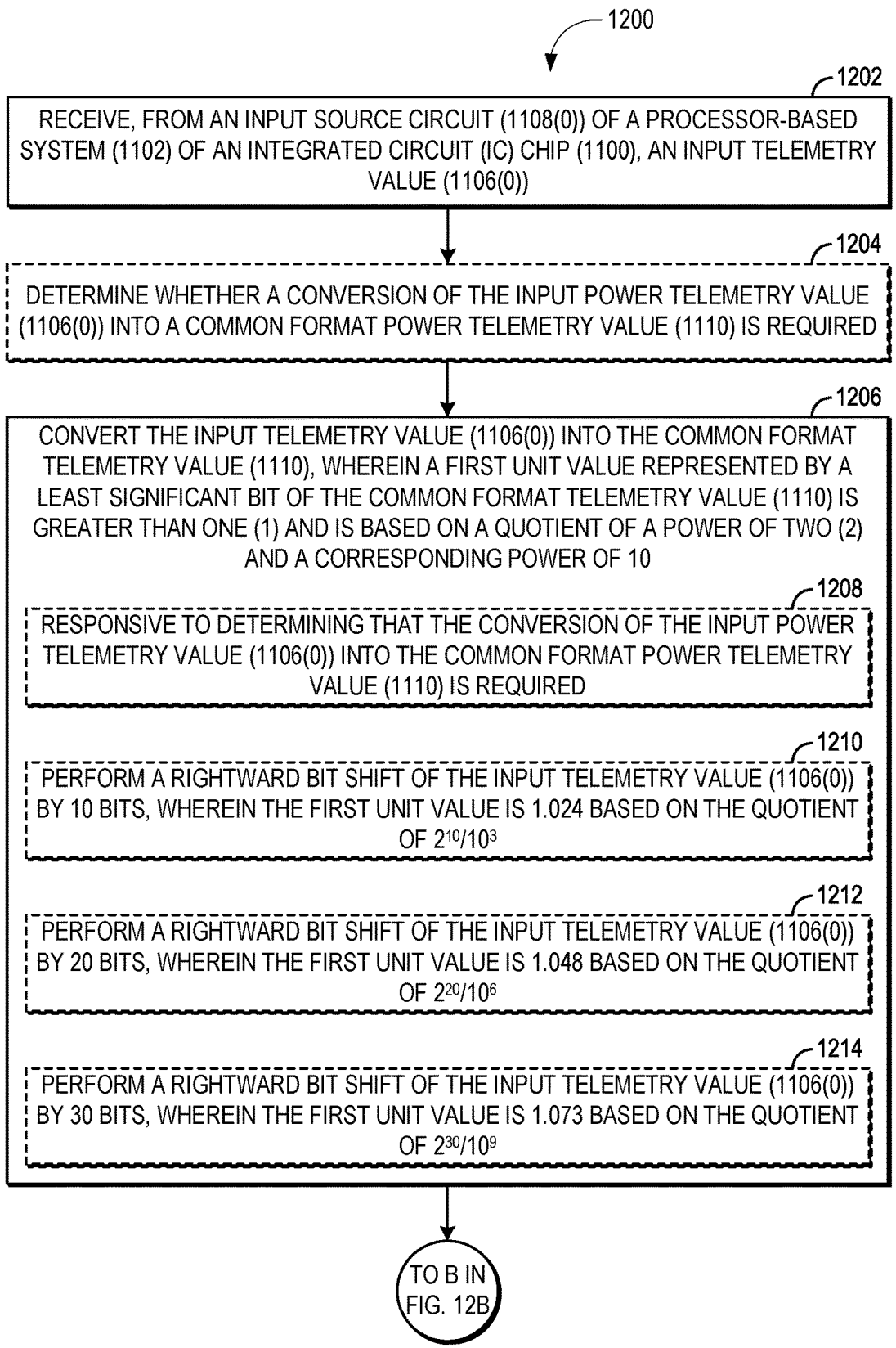
FIGS. 12A-12B provide a flowchart illustrating exemplary operations for converting input power telemetry values into common data format values where a least significant bit represents a unit value greater that one (1), according to some aspects.
Figure 12B:
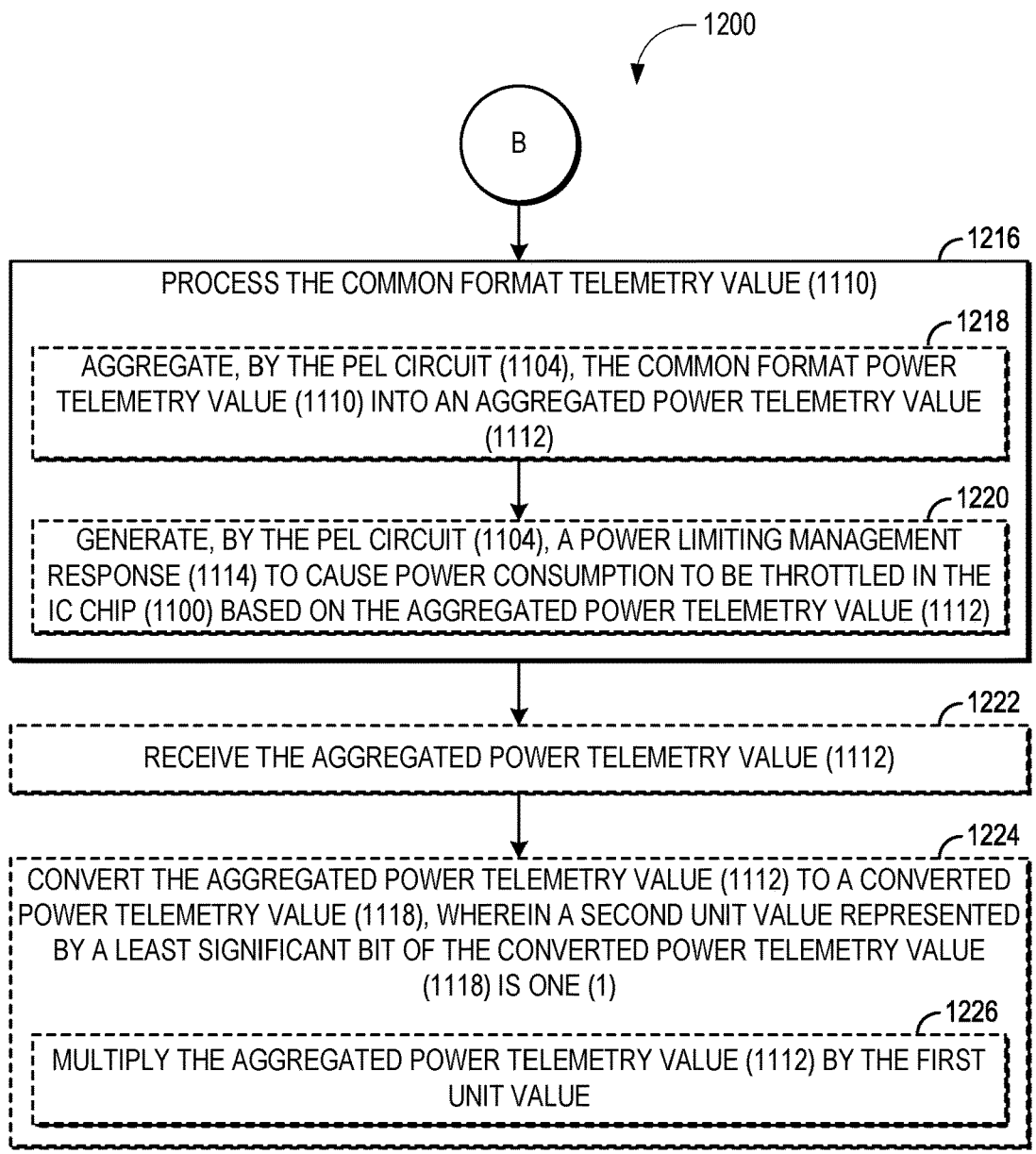

To illustrate exemplary operations for converting input power telemetry values into common data format values where a least significant bit represents a unit value greater than one (1), FIGS. 12A-12B provide a flowchart showing exemplary operations 1200. For the sake of clarity, elements of FIG. 11 are referenced in describing FIGS. 12A-12B. It is to be understood that, in some aspects, operations shown in FIGS. 12A-12B may be performed in an order other than that illustrated herein, and/or may be omitted.

The exemplary operations 1200 begin in FIG. 12A with the processor-based system 1102 of FIG. 11 (e.g., using the PEL circuit 1104 of FIG. 11) receiving an input telemetry value (e.g., the input power telemetry value 1106(0) of FIG. 11) from an input source circuit of a processor-based system of an IC chip, such as the input source circuit 1108(0) of the processor-based system 1102 of the IC chip 1100 of FIG. 11 (block 1202). Note that the input power telemetry value 1106(0) is referred to as such in describing the example illustrated in FIG. 11, but is also referred to more generally as the "input telemetry value 1106(0)" below in describing more general aspects. Some aspects may provide that the processor-based system 1102 may determine that a conversion of the input power telemetry value 1106(0) into a common format power telemetry value (e.g., the common format power telemetry value 1110 of FIG. 11) is required (block 1204). It is to be understood that the common format power telemetry value 1110 is referred to as such in describing the example illustrated in FIG. 11, but is also referred to more generally as the "common format telemetry value 1110" below in describing more general aspects.

The processor-based system 1102 converts the input telemetry value 1106(0) into the common format telemetry value 1110, wherein a first unit value represented by a least significant bit of the common format telemetry value 1110 is greater than one (1) and is based on a quotient of a power of two (2) and a corresponding power of 10 (block 1206). In the aspects mentioned above and illustrated in FIG. 11, the operations of block 1206 for converting the input power telemetry value 1106(0) into the common format power telemetry value 1110 is performed responsive to determining that the conversion of the input power telemetry value 1106(0) into the common format power telemetry value 1110 is required (block 1208).

According to some aspects, the operations of the operations of block 1206 for converting the input telemetry value 1106(0) into the common format telemetry value 1110 may comprise the processor-based system 1102 performing a rightward bit shift of the input telemetry value 1106(0) by 10 bits, wherein the first unit value is 1.024 based on the quotient of $2^{10}/10^3$ (block 1210). Some aspects may provide that the operations of the operations of block 1206 for converting the input telemetry value 1106(0) into the common format telemetry value 1110 comprise the processor-based system 1102 performing a rightward bit shift of the input telemetry value 1106(0) by 20 bits, wherein the first unit value is 1.048 based on the quotient of $2^{20}/10^6$ (block 1212). In some aspects, the operations of the operations of block 1206 for converting the input telemetry value 1106(0) into the common format telemetry value 1110 may comprise the processor-based system 1102 performing a rightward bit shift of the input telemetry value 1106(0) by 30 bits, wherein the first unit value is 1.073 based on the quotient of $2^{30}/10^9$ (block 1214). The exemplary operations 1200 then continue at block 1216 of FIG. 12B.

Turning now to FIG. 12B, the exemplary operations 1200 continue with the processor-based system 1102 processing the common format telemetry value 1110. In aspects in which the common format telemetry value 1110 comprises the common format power telemetry value 1110, the operations of block 1216 for processing the common format telemetry value 1110 may comprise aggregating the common format power telemetry value 1110 into an aggregated power telemetry value such as the aggregated power telemetry value 1112 of FIG. 11 (block 1218). The processor-based system 1102 then generates a power limiting management response (e.g., the power limiting management response 1114 of FIG. 11) to cause power consumption to be throttled in the IC chip 1100 based on the aggregated power telemetry value 1112 (block 1220).

In some aspects illustrated in FIG. 11, the processor-based system 1102 (e.g., using the firmware 1116) may receive the aggregated power telemetry value 1112 (block 1222). The processor-based system 1102 may convert the aggregated power telemetry value 1112 to a converted power telemetry value (e.g., the converted power telemetry value 1118 of FIG. 11), wherein a second unit value represented by a least significant bit of the converted power telemetry value 1118 is one (1) (block 1224). Some aspects may provide that the operations of block 1222 for converting the aggregated power telemetry value 1112 to the converted power telemetry value 1118 may comprise multiplying the aggregated power telemetry value 1112 by the first unit value (block 1226).

A hierarchical power management system that can be provided in an IC chip for an integrated processor-based system that is configured to locally monitor activity of devices in the processor-based system to locally estimate and throttle its power consumption, and report activity power events regarding estimated power consumption to a centralized PEL circuit configured to collect activity power events regarding power consumption of the monitored processing devices and throttle power in the IC chip in response, including but not limited to the hierarchical power management systems and their exemplary components in FIGS. 1-3, 5-7, and 9A-11, and operating according to the exemplary process 800 in FIG. 8, and according to any aspects disclosed herein. may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 13:
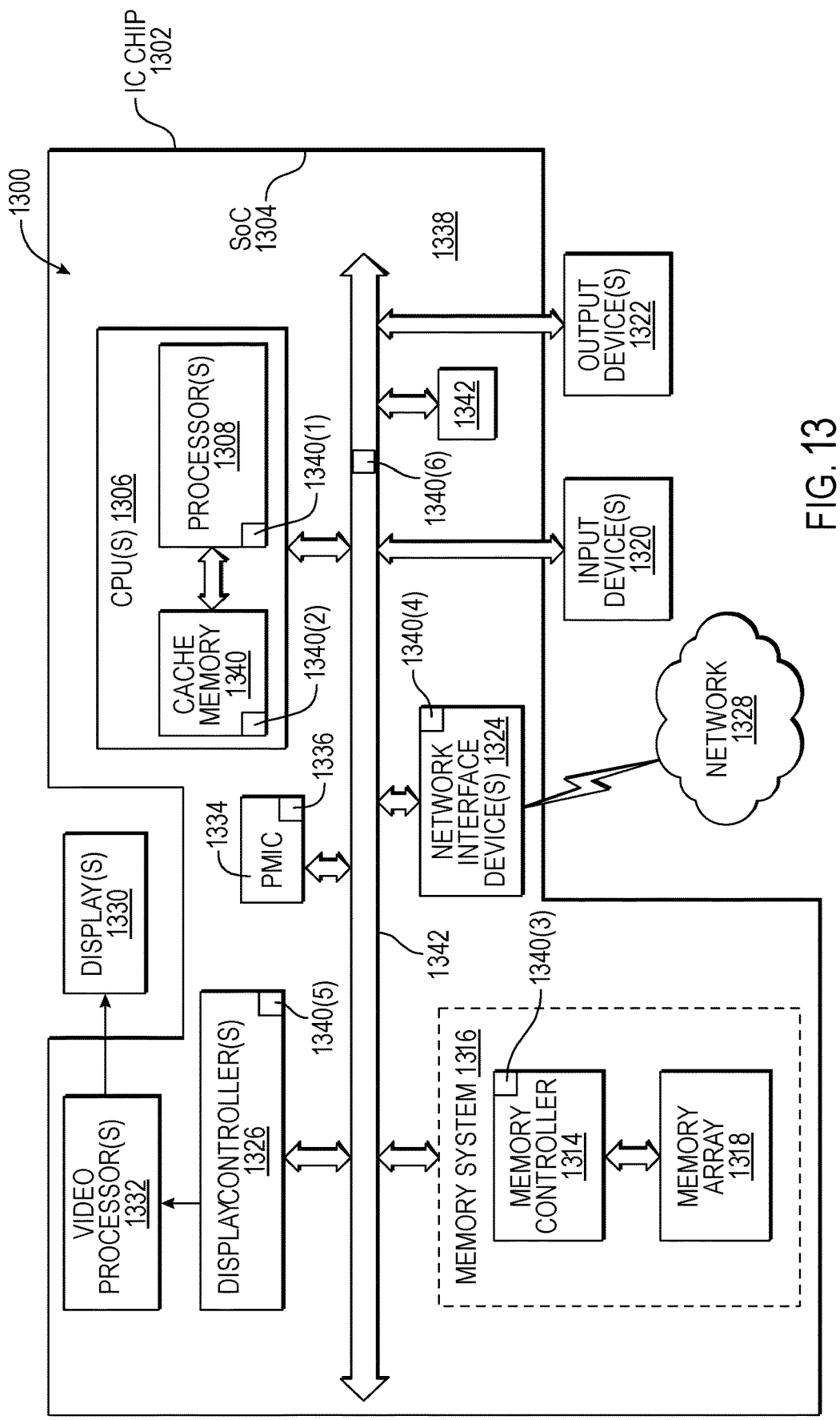
FIG. 13 is a block diagram of another exemplary processor-based system that includes a hierarchical power management system configured to locally monitor activity of devices in the processor-based system to estimate and throttle its power consumption and report activity power events regarding estimated power consumption to the PEL circuit, wherein the PEL circuit is configured to collect activity power events regarding power consumption of the monitored processing devices and throttle power in the IC chip in response, including but not limited to the hierarchical power management systems and their exemplary components in FIGS. 1-3, 5-7, 9A, 10, and 11.

FIG. 13 is a block diagram of another exemplary processor-based system that includes a hierarchical power management system configured to locally monitor activity of devices in the processor-based system to locally estimate and throttle its power consumption, and report activity power events regarding estimated power consumption to a centralized PEL circuit configured to collect activity power events regarding power consumption of the monitored processing devices and throttle power in the IC chip in response, including but not limited to the hierarchical power management systems 124, 624, 724 and their exemplary components in FIGS. 1-3, 5-7, and 9A-10.

In this example, the processor-based system 1300 may be formed in an IC chip 1302 and as a system-on-a-chip (SoC) 1304. The processor-based system 1300 includes a central processing unit (CPU) (s) 1306 that includes one or more processors 1308, which may also be referred to as CPU cores or processor cores. The CPU 1306 may have cache memory 1310 coupled to the CPU 1306 for rapid access to temporarily stored data. The CPU 1306 is coupled to a system bus 1312 and can intercouple master and slave devices included in the processor-based system 1300. As is well known, the CPU 1306 communicates with these other devices by exchanging address, control, and data information over the system bus 1312. For example, the CPU 1306 can communicate bus transaction requests to a memory controller 1314, as an example of a slave device. Although not illustrated in FIG. 13, multiple system buses 1312 could be provided, wherein each system bus 1312 constitutes a different fabric.

Other master and slave devices can be connected to the system bus 1312. As illustrated in FIG. 13, these devices can include a memory system 1316 that includes the memory controller 1314 and a memory array(s) 1318, one or more input devices 1320. one or more output devices 1322, one or more network interface devices 1324, and one or more display controllers 1326, as examples. The input device(s) 1320 can include any type of input device, including, but not limited to, input keys, switches, voice processors, etc. The output device(s) 1322 can include any type of output device, including, but not limited to, audio, video, other visual indicators, etc. The network interface device(s) 1324 can be any device configured to allow exchange of data to and from a network 1328. The network 1328 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1324 can be configured to support any type of communications protocol desired.

The CPU 1306 may also be configured to access the display controller(s) 126 over the system bus 1312 to control information sent to one or more displays 1330. The display controller(s) 1326 sends information to the display(s) 1330 to be displayed via one or more video processor(s) 1332, which process the information to be displayed into a format suitable for the display(s) 1330. The display(s) 1330 can include any type of display, including, but not limited to, a cathode ray tube (CRT), a liquid crystal display (LCD), a plasma display, a light emitting diode (LED) display, etc. The IC chip 1302 also includes a PMIC 1334 that includes a PEL circuit 1336 as part of a hierarchical power management system 1338. The PEL circuit 1336 can be the PEL circuit 126 in the hierarchical power management systems 124, 624, 724 in FIGS. 1-3, 5-7, and 9 as examples. The hierarchical power management system 1338 can include one or more LAM circuits 1340(1)-1340(6) that are associated with one or more of the processors 1308, the cache memory 1310, the memory controller 1314, the network interface device(s) 1324, the display controller 1326, and/or the system bus 1312 that are configured to monitor activity associated with these processing devices and reporting activity power events regarding activity of these devices within the hierarchical power management system 1338. The LAM circuits 1340(1)-1340(6) may be the LAM circuits 136, 136R in the hierarchical power management systems 124, 624, 724 in FIGS. 1-3, 5-7, and 10A as examples. One or more RAM circuits 1342 may also be provided as part of the hierarchical power management system 1338 to receive activity power events from groupings of LAM circuits 1340(1)-1340(6) to aggregate such activity power events into aggregated activity power events to be communicated to the PEL circuit 1336. The RAM circuits 1342 may be the RAM circuits 502 in the hierarchical power management systems 124, 624, 724 in FIGS. 1-3, and 5-7 as examples.

Figure 14:
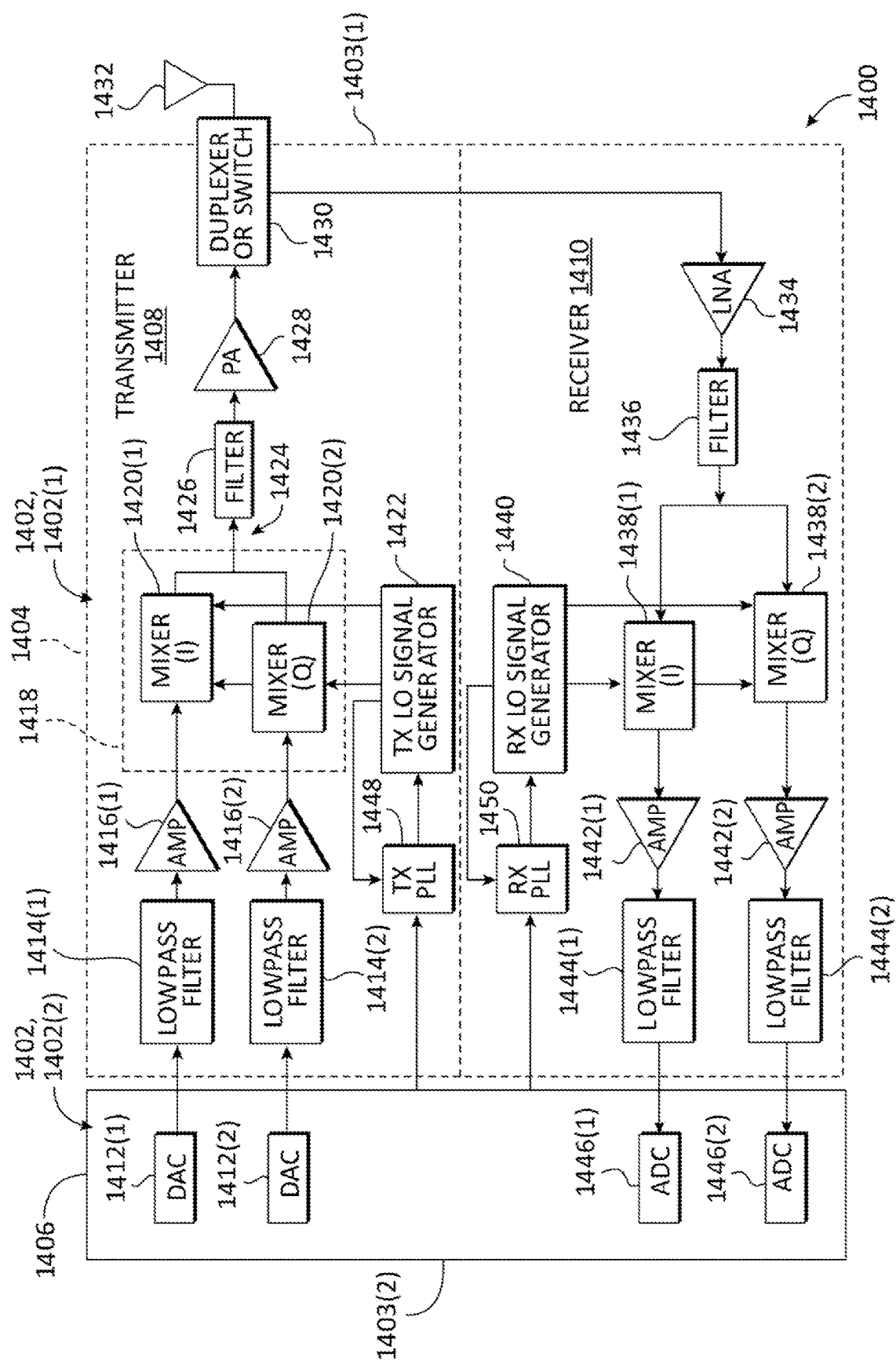
FIG. 14 is a block diagram of an exemplary wireless communications device that includes a hierarchical power management system configured to locally monitor activity of devices in the processor-based system to estimate and throttle its power consumption and report activity power events regarding estimated power consumption to the PEL circuit, wherein the PEL circuit is configured to collect activity power events regarding power consumption of the monitored processing devices and throttle power in the IC chip in response, including but not limited to the hierarchical power management systems and their exemplary components in FIGS. 1-3, 5-7, 9A, 10, and 11.

FIG. 14 illustrates an exemplary wireless communications device 1400 that can includes a hierarchical power management system 1402 configured to locally monitor activity of devices in the processor-based system to locally estimate and throttle its power consumption, and report activity power events regarding estimated power consumption to a centralized PEL circuit configured to collect activity power events regarding power consumption of the monitored processing devices and throttle power in the IC chip in response, including but not limited to the hierarchical power management systems 124, 624, 724 and their exemplary components in FIGS. 1-3, 5-7, and 9A-11.

As shown in FIG. 14, the wireless communications device 1400 includes a RF transceiver 1404 and a data processor 1406. The RF transceiver 1404 and/or the data processor 1406 can include respective hierarchical power management systems 1402(1), 1402(2) configured to locally monitor activity of devices in the processor-based system to locally estimate and throttle its power consumption, and report activity power events regarding estimated power consumption to a centralized PEL circuit configured to collect activity power events regarding power consumption of the monitored processing devices and throttle power in the IC chip in response, including but not limited to the hierarchical power management systems 124, 624, 724 and their exemplary components in FIGS. 1-3, 5-7, and 9A-10.

The components of the RF transceiver 1404 and/or data processor 1406 can be split among multiple different die 1403(1), 1403(2). The data processor 1406 may include a memory to store data and program codes. The RF transceiver 1404 includes a transmitter 1408 and a receiver 1410 that support bi-directional communications. In general, the wireless communications device 1400 may include any number of transmitters 1408 and/or receivers 1410 for any number of communication systems and frequency bands. All or a portion of the RF transceiver 1404 may be implemented on one or more analog ICs, RF ICs, mixed-signal ICs, etc.

The transmitter 1408 or the receiver 1410 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 1410. In the direct-conversion architecture, a signal is frequency-converted between RF and baseband in one stage. The super-heterodyne and direct-conversion architectures may use different circuit blocks and/or have different requirements. In the wireless communications device 1400 in FIG. 14, the transmitter 1408 and the receiver 1410 are implemented with the direct-conversion architecture.

In the transmit path, the data processor 1406 processes data to be transmitted and provides I and Q analog output signals to the transmitter 1408. In the exemplary wireless communications device 1400, the data processor 1406 includes digital-to-analog converters (DACs) 1412(1), 1412(2) for converting digital signals generated by the data processor 1406 into the I and Q analog output signals, e.g., I and Q output currents, for further processing.

Within the transmitter 1408, lowpass filters 1414(1), 1414(2) filter the I and Q analog output signals, respectively, to remove undesired signals caused by the prior digital-to-analog conversion. Amplifiers (AMPs) 1416(1), 1416(2) amplify the signals from the lowpass filters 1414(1), 1414(2), respectively, and provide I and Q baseband signals. An upconverter 1418 upconverts the I and Q baseband signals with I and Q transmit (TX) local oscillator (LO) signals through mixers 1420(1), 1420(2) from a TX LO signal generator 1422 to provide an upconverted signal 1424. A filter 1426 filters the upconverted signal 1424 to remove undesired signals caused by the frequency upconversion as well as noise in a receive frequency band. A power amplifier (PA) 1428 amplifies the upconverted signal 1424 from the filter 1426 to obtain the desired output power level and provides a transmit RF signal. The transmit RF signal is routed through a duplexer or switch 1430 and transmitted via an antenna 1432.

In the receive path, the antenna 1432 receives signals transmitted by base stations and provides a received RF signal, which is routed through the duplexer or switch 1430 and provided to a low noise amplifier (LNA) 1434. The duplexer or switch 1430 is designed to operate with a specific receive (RX)-to-TX duplexer frequency separation, such that RX signals are isolated from TX signals. The received RF signal is amplified by the LNA 1434 and filtered by a filter 1436 to obtain a desired RF input signal. Down-conversion mixers 1438(1), 1438(2) mix the output of the filter 1436 with I and Q RX LO signals (i.e., LO_I and LO_Q) from an RX LO signal generator 1440 to generate I and Q baseband signals. The I and Q baseband signals are amplified by AMPs 1442(1), 1442(2) and further filtered by lowpass filters 1444(1), 1444(2) to obtain I and Q analog input signals, which are provided to the data processor 1406. In this example, the data processor 1406 includes analog-to-digital converters (ADCs) 1446(1), 1446(2) for converting the analog input signals into digital signals to be further processed by the data processor 1406.

In the wireless communications device 1400 of FIG. 14, the TX LO signal generator 1422 generates the I and Q TX LO signals used for frequency upconversion, while the RX LO signal generator 1440 generates the I and Q RX LO signals used for frequency downconversion. Each LO signal is a periodic signal with a particular fundamental frequency. A TX phase-locked loop (PLL) circuit 1448 receives timing information from the data processor 1406 and generates a control signal used to adjust the frequency and/or phase of the TX LO signals from the TX LO signal generator 1422. Similarly, an RX PLL circuit 1450 receives timing information from the data processor 1406 and generates a control signal used to adjust the frequency and/or phase of the RX LO signals from the RX LO signal generator 1440.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory, flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An integrated circuit (IC) chip comprising a processor-based system, the processor-based system configured to:
   receive, from an input source circuit of the processor-based system, an input telemetry value;
   convert the input telemetry value into a common format telemetry value, wherein a first unit value represented by a least significant bit of the common format telemetry value is greater than one (1) and is based on a quotient of a power of two (2) and a corresponding power of 10; and
   process the common format telemetry value.

2. The IC chip of clause 1, wherein:
   the input telemetry value comprises an input power telemetry value; and
   the common format telemetry value comprises a common format power telemetry value;
   the input power telemetry value and the common format power telemetry value each represent a measurement of one of capacitance, electric charge, energy, and current.

3. The IC chip of clause 2, wherein the processor-based system is further configured to process the common format telemetry value by being configured to:
  aggregate the common format power telemetry value into an aggregated power telemetry value; and
  generate a power limiting management response to cause power consumption to be throttled in the IC chip based on the aggregated power telemetry value.

4. The IC chip of clause 3, wherein the processor-based system is further configured to:
  receive the aggregated power telemetry value; and
  convert the aggregated power telemetry value to a converted power telemetry value, wherein a second unit value represented by a least significant bit of the converted power telemetry value is one (1).

5. The IC chip of clause 4, wherein the IC chip is configured to convert the aggregated power telemetry value to the converted power telemetry value by being configured to multiply the aggregated power telemetry value by the first unit value.

6. The IC chip of any one of clauses 1-5, wherein:
  the IC chip is configured to convert the input telemetry value into the common format telemetry value by being configured to perform a rightward bit shift of the input telemetry value by 10 bits; and
  the first unit value is 1.024 based on the quotient of $2^{10}/10^3$.

7. The IC chip of any one of clauses 1-5, wherein:
  the IC chip is configured to convert the input telemetry value into the common format telemetry value by being configured to perform a rightward bit shift of the input telemetry value by 20 bits; and
  the first unit value is 1.048 based on the quotient of $2^{20}/10^6$.

8. The IC chip of any one of clauses 1-5, wherein:
  the IC chip is configured to convert the input telemetry value into the common format telemetry value by being configured to perform a rightward bit shift of the input telemetry value by 30 bits; and
  the first unit value is 1.073 based on the quotient of $2^{30}/10^9$.

9. The IC chip of any one of clauses 1-8, wherein:
  the IC chip is further configured to determine whether a conversion of the input telemetry value into the common format telemetry value is required; and
  the IC chip is configured to convert the input telemetry value into the common format telemetry value responsive to determining that the conversion of the input telemetry value into the common format telemetry value is required.

10. The IC chip of any one of clauses 1-9, wherein:
  the IC chip comprises a power estimation and limiting (PEL) circuit; and
  the input source circuit comprises one of a local activity management (LAM) circuit of the IC, a regional activity management (RAM) circuit of the IC, a processing unit of the IC, and a power management IC (PMIC) of the IC.

11. The IC chip of clause 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

12. An integrated circuit (IC) chip, comprising:
  means for receiving, from an input source circuit, an input telemetry value;
  means for converting the input telemetry value into a common format telemetry value, wherein a first unit value represented by a least significant bit of the common format telemetry value is greater than one (1) and is based on a quotient of a power of two (2) and a corresponding power of 10;
  means for processing the common format telemetry value.

13. A method for converting a telemetry value into a common data format in a processor-based system in an integrated circuit (IC) chip, the method comprising:
  receiving, from an input source circuit of the processor-based system, an input telemetry value;
  converting the input telemetry value into a common format telemetry value, wherein a first unit value represented by a least significant bit of the common format telemetry value is greater than one (1) and is based on a quotient of a power of two (2) and a corresponding power of 10;
  processing the common format telemetry value.

14. The method of clause 13, wherein:
  the input telemetry value comprises an input power telemetry value;
  the common format telemetry value comprises a common format power telemetry value; and
  the input power telemetry value and the common format power telemetry value each represent a measurement of one of capacitance, electric charge, energy, and current.

15. The method of clause 14, wherein processing the common format telemetry value comprises:
  aggregating the common format power telemetry value into an aggregated power telemetry value; and
  generating a power limiting management response to cause power consumption to be throttled in the IC chip based on the aggregated power telemetry value.

16. The method of clause 15, further comprising:
  receiving the aggregated power telemetry value; and
  converting the aggregated power telemetry value to a converted power telemetry value, wherein a second unit value represented by a least significant bit of the converted power telemetry value is one (1).

17. The method of clause 16, wherein converting the aggregated power telemetry value to the converted power telemetry value comprises multiplying the aggregated power telemetry value by the first unit value.

18. The method of any one of clauses 13-17, wherein:
  converting the input telemetry value into the common format telemetry value comprises performing a rightward bit shift of the input telemetry value by 10 bits; and
  the first unit value is 1.024 based on the quotient of $2^{10}/10^3$.

19. The method of any one of clauses 13-17, wherein:
  converting the input telemetry value into the common format telemetry value comprises performing a rightward bit shift of the input telemetry value by 20 bits; and
  the first unit value is 1.048 based on the quotient of $2^{20}/10^6$.

20. The method of any one of clauses 13-17, wherein:
  converting the input telemetry value into the common format telemetry value comprises performing a rightward bit shift of the input telemetry value by 30 bits; and
  the first unit value is 1.073 based on the quotient of $2^{30}/10^9$.
21. The method of any one of clauses 13-20, further comprising determining that a conversion of the input telemetry value into the common format telemetry value is required;
  wherein converting the input telemetry value into the common format telemetry value is responsive to determining that the conversion of the input telemetry value into the common format telemetry value is required.
22. The method of any one of clauses 13-21, wherein:
  the IC chip comprises a power estimation and limiting (PEL) circuit; and
  the input source circuit comprises one of a local activity management (LAM) circuit of the IC, a regional activity management (RAM) circuit of the IC, a processing unit of the IC, and a power management IC (PMIC) of the IC.
23. A non-transitory computer-readable medium, having stored thereon computer-executable instructions that, when executed, cause a processor of a processor-based device to:
  receive, from an input source circuit of the processor-based system, an input telemetry value;
  convert the input telemetry value into a common format telemetry value, wherein a first unit value represented by a least significant bit of the common format telemetry value is greater than one (1) and is based on a quotient of a power of two (2) and a corresponding power of 10;
  process the common format telemetry value.
24. The non-transitory computer-readable medium of clause 23, wherein:
  the input telemetry value comprises an input power telemetry value; and
  the common format telemetry value comprises a common format power telemetry value;
  the input power telemetry value and the common format power telemetry value each represent a measurement of one of capacitance, electric charge, energy, and current.
25. The non-transitory computer-readable medium of clause 24, wherein the computer-executable instructions cause the processor to process the common format telemetry value by causing the processor to:
  aggregate the common format power telemetry value into an aggregated power telemetry value; and
  generate a power limiting management response to cause power consumption to be throttled in an integrated circuit (IC) chip based on the aggregated power telemetry value.
26. The non-transitory computer-readable medium of clause 25, wherein the computer-executable instructions further cause the processor to convert the aggregated power telemetry value to a converted power telemetry value, wherein a second unit value represented by a least significant bit of the converted power telemetry value is one (1).
27. The non-transitory computer-readable medium of clause 26, wherein the computer-executable instructions cause the processor to convert the aggregated power telemetry value to the converted power telemetry value by causing the processor to multiply the aggregated power telemetry value by the first unit value.
28. The non-transitory computer-readable medium of any one of clauses 23-27, wherein:
  the computer-executable instructions further cause the processor to convert the input telemetry value into the common format telemetry value by causing the processor to perform a rightward bit shift of the input telemetry value by 10 bits; and
  the first unit value is 1.024 based on the quotient of $2^{10}/10^3$.
29. The non-transitory computer-readable medium of any one of clauses 23-27, wherein:
  the computer-executable instructions further cause the processor to convert the input telemetry value into the common format telemetry value by causing the processor to perform a rightward bit shift of the input telemetry value by 20 bits; and
  the first unit value is 1.048 based on the quotient of $2^{20}/10^6$.
30. The non-transitory computer-readable medium of any one of clauses 23-27, wherein:
  the computer-executable instructions further cause the processor to convert the input telemetry value into the common format telemetry value by causing the processor to perform a rightward bit shift of the input telemetry value by 30 bits; and
  the first unit value is 1.073 based on the quotient of $2^{30}/10^9$.
31. The non-transitory computer-readable medium of any one of clauses 23-30, wherein:
  the computer-executable instructions further cause the processor to determine whether a conversion of the input telemetry value into the common format telemetry value is required; and
  the computer-executable instructions cause the processor to convert the input telemetry value into the common format telemetry value responsive to determining that the conversion of the input telemetry value into the common format telemetry value is required.

What is claimed is:
1. An integrated circuit (IC) chip comprising a processor-based system, the processor-based system configured to:
  receive, from an input source circuit of the processor-based system, an input telemetry value;
  convert the input telemetry value into a common format telemetry value, wherein a first unit value represented by a least significant bit of the common format telemetry value is greater than one (1) and is based on a quotient of a power of two (2) and a corresponding power of 10; and
  process the common format telemetry value, wherein:
  the input telemetry value comprises an input power telemetry value; and
  the common format telemetry value comprises a common format power telemetry value;
  the input power telemetry value and the common format power telemetry value each represent a measurement of one of capacitance, electric charge, energy, and current, and wherein the processor-based system is further configured to process the common format telemetry value by being configured to:
    aggregate the common format power telemetry value into an aggregated power telemetry value; and
    generate a power limiting management response to cause power consumption to be throttled in the IC chip based on the aggregated power telemetry value.

2. The IC chip of claim 1, wherein the processor-based system is further configured to:
receive the aggregated power telemetry value; and
convert the aggregated power telemetry value to a converted power telemetry value, wherein a second unit value represented by a least significant bit of the converted power telemetry value is one (1).

3. The IC chip of claim 2, wherein the IC chip is configured to convert the aggregated power telemetry value to the converted power telemetry value by being configured to multiply the aggregated power telemetry value by the first unit value.

4. The IC chip of claim 1, wherein:
the IC chip is configured to convert the input telemetry value into the common format telemetry value by being configured to perform a rightward bit shift of the input telemetry value by 10 bits; and
the first unit value is 1.024 based on the quotient of $2^{10}/10^3$.

5. The IC chip of claim 1, wherein:
the IC chip is configured to convert the input telemetry value into the common format telemetry value by being configured to perform a rightward bit shift of the input telemetry value by 20 bits; and
the first unit value is 1.048 based on the quotient of $2^{20}/10^6$.

6. The IC chip of claim 1, wherein:
the IC chip is configured to convert the input telemetry value into the common format telemetry value by being configured to perform a rightward bit shift of the input telemetry value by 30 bits; and
the first unit value is 1.073 based on the quotient of $2^{30}/10^9$.

7. The IC chip of claim 1, wherein:
the IC chip is further configured to determine whether a conversion of the input telemetry value into the common format telemetry value is required; and
the IC chip is configured to convert the input telemetry value into the common format telemetry value responsive to determining that the conversion of the input telemetry value into the common format telemetry value is required.

8. The IC chip of claim 1, wherein:
the IC chip comprises a power estimation and limiting (PEL) circuit; and
the input source circuit comprises one of a local activity management (LAM) circuit of the IC, a regional activity management (RAM) circuit of the IC, a processing unit of the IC, and a power management IC (PMIC) of the IC.

9. The IC chip of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. An integrated circuit (IC) chip, comprising:
means for receiving, from an input source circuit, an input telemetry value;
means for converting the input telemetry value into a common format telemetry value, wherein a first unit value represented by a least significant bit of the common format telemetry value is greater than one (1) and is based on a quotient of a power of two (2) and a corresponding power of 10;
means for processing the common format telemetry value, wherein:
the input telemetry value comprises an input power telemetry value; and
the common format telemetry value comprises a common format power telemetry value;
the input power telemetry value and the common format power telemetry value each represent a measurement of one of capacitance, electric charge, energy, and current,
and wherein the means for processing the common format telemetry value comprises:
means for aggregating the common format power telemetry value into an aggregated power telemetry value; and
means for generating a power limiting management response to cause power consumption to be throttled in the IC chip based on the aggregated power telemetry value.

11. A method for converting a telemetry value into a common data format in a processor-based system in an integrated circuit (IC) chip, the method comprising:
receiving, from an input source circuit of the processor-based system, an input telemetry value;
converting the input telemetry value into a common format telemetry value, wherein a first unit value represented by a least significant bit of the common format telemetry value is greater than one (1) and is based on a quotient of a power of two (2) and a corresponding power of 10;
processing the common format telemetry value, wherein the input telemetry value comprises an input power telemetry value;
the common format telemetry value comprises a common format power telemetry value; and
the input power telemetry value and the common format power telemetry value each represent a measurement of one of capacitance, electric charge, energy, and current,
wherein processing the common format telemetry value comprises:
aggregating the common format power telemetry value into an aggregated power telemetry value; and
generating a power limiting management response to cause power consumption to be throttled in the IC chip based on the aggregated power telemetry value.

12. The method of claim 11, further comprising:
receiving the aggregated power telemetry value; and
converting the aggregated power telemetry value to a converted power telemetry value, wherein a second unit value represented by a least significant bit of the converted power telemetry value is one (1).

13. The method of claim 12, wherein converting the aggregated power telemetry value to the converted power telemetry value comprises multiplying the aggregated power telemetry value by the first unit value.

14. The method of claim 11, wherein:
converting the input telemetry value into the common format telemetry value comprises performing a rightward bit shift of the input telemetry value by 10 bits; and the first unit value is 1.024 based on the quotient of $2^{10}/10^3$.

15. The method of claim 11, wherein:
converting the input telemetry value into the common format telemetry value comprises performing a rightward bit shift of the input telemetry value by 20 bits; and
the first unit value is 1.048 based on the quotient of $2^{20}/10^6$.

16. The method of claim 11, wherein:
converting the input telemetry value into the common format telemetry value comprises performing a rightward bit shift of the input telemetry value by 30 bits; and
the first unit value is 1.073 based on the quotient of $2^{30}/10^9$.

17. The method of claim 11, further comprising determining that a conversion of the input telemetry value into the common format telemetry value is required;
wherein converting the input telemetry value into the common format telemetry value is responsive to determining that the conversion of the input telemetry value into the common format telemetry value is required.

18. The method of claim 11, wherein:
the IC chip comprises a power estimation and limiting (PEL) circuit; and
the input source circuit comprises one of a local activity management (LAM) circuit of the IC, a regional activity management (RAM) circuit of the IC, a processing unit of the IC, and a power management IC (PMIC) of the IC.

19. A non-transitory computer-readable medium, having stored thereon computer-executable instructions that, when executed, cause a processor of a processor-based device to:
receive, from an input source circuit of the processor-based system, an input telemetry value;
convert the input telemetry value into a common format telemetry value, wherein a first unit value represented by a least significant bit of the common format telemetry value is greater than one (1) and is based on a quotient of a power of two (2) and a corresponding power of 10;
process the common format telemetry value, wherein
the input telemetry value comprises an input power telemetry value; and
the common format telemetry value comprises a common format power telemetry value;
the input power telemetry value and the common format power telemetry value each represent a measurement of one of capacitance, electric charge, energy, and current,
wherein the computer-executable instructions cause the processor to process the common format telemetry value by causing the processor to:
aggregate the common format power telemetry value into an aggregated power telemetry value; and
generate a power limiting management response to cause power consumption to be throttled in an integrated circuit (IC) chip based on the aggregated power telemetry value.

20. The non-transitory computer-readable medium of claim 19, wherein the computer-executable instructions further cause the processor to convert the aggregated power telemetry value to a converted power telemetry value, wherein a second unit value represented by a least significant bit of the converted power telemetry value is one (1).

21. The non-transitory computer-readable medium of claim 20, wherein the computer-executable instructions cause the processor to convert the aggregated power telemetry value to the converted power telemetry value by causing the processor to multiply the aggregated power telemetry value by the first unit value.

22. The non-transitory computer-readable medium of claim 19, wherein:
the computer-executable instructions further cause the processor to convert the input telemetry value into the common format telemetry value by causing the processor to perform a rightward bit shift of the input telemetry value by 10 bits; and
the first unit value is 1.024 based on the quotient of $2^{10}/10^3$.

23. The non-transitory computer-readable medium of claim 19, wherein:
the computer-executable instructions further cause the processor to convert the input telemetry value into the common format telemetry value by causing the processor to perform a rightward bit shift of the input telemetry value by 20 bits; and
the first unit value is 1.048 based on the quotient of $2^{20}/10^6$.

24. The non-transitory computer-readable medium of claim 19, wherein:
the computer-executable instructions further cause the processor to convert the input telemetry value into the common format telemetry value by causing the processor to perform a rightward bit shift of the input telemetry value by 30 bits; and
the first unit value is 1.073 based on the quotient of $2^{30}/10^9$.

25. The non-transitory computer-readable medium of claim 19, wherein:
the computer-executable instructions further cause the processor to determine whether a conversion of the input telemetry value into the common format telemetry value is required; and
the computer-executable instructions cause the processor to convert the input telemetry value into the common format telemetry value responsive to determining that the conversion of the input telemetry value into the common format telemetry value is required.

* * * * *